United States Patent
Ha et al.

(10) Patent No.: US 10,659,445 B2
(45) Date of Patent: May 19, 2020

(54) ELECTRONIC APPARATUS, GATEWAY AND METHOD FOR CONTROLLING THE SAME

(71) Applicant: SAMSUNG ELECTRONICS CO., LTD., Suwon-si (KR)

(72) Inventors: Ji-Hun Ha, Suwon-si (KR); Jae-keun Lee, Seoul (KR); Do-Il Kwon, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/017,754

(22) Filed: Feb. 8, 2016

(65) Prior Publication Data

US 2016/0344593 A1 Nov. 24, 2016

(30) Foreign Application Priority Data

May 22, 2015 (KR) ........................ 10-2015-0072136

(51) Int. Cl.
*H04L 29/06* (2006.01)
*H04W 4/70* (2018.01)
(Continued)

(52) U.S. Cl.
CPC .......... *H04L 63/08* (2013.01); *H04L 12/6418* (2013.01); *H04L 65/403* (2013.01);
(Continued)

(58) Field of Classification Search
CPC ... H04L 63/08; H04L 65/403; H04L 12/6418; H04W 4/08
(Continued)

(56) References Cited

U.S. PATENT DOCUMENTS

2002/0069276 A1* 6/2002 Hino .................. H04L 12/2803
709/223
2004/0150546 A1* 8/2004 Choi ..................... H04B 1/202
341/176
(Continued)

FOREIGN PATENT DOCUMENTS

CN 1985471 A 6/2007
CN 101835063 A 9/2010
(Continued)

OTHER PUBLICATIONS

Communication dated Aug. 24, 2016, issued by the International Searching Authority in counterpart International Application No. PCT/KR2016/005365 (PCT/ISA/210 & 237).
(Continued)

Primary Examiner — Meng Vang
(74) Attorney, Agent, or Firm — Sughrue Mion, PLLC

(57) ABSTRACT

A method for controlling a controlled electronic device by using an electronic device includes storing a group operation command including attribute information and operation information, the attribute information and the operation information corresponding to at least one controlled electronic device; and when the electronic device enters a network, transmitting the group operation command to at least one of a gateway, configured to manage the network, and at least one first controlled electronic device that is determined to correspond to the group operation command in the network, to perform an operation based on the operation information included in the group operation command.

14 Claims, 27 Drawing Sheets

(51) Int. Cl.
*H04W 4/08* (2009.01)
*H04L 12/64* (2006.01)

(52) U.S. Cl.
CPC ............... *H04W 4/08* (2013.01); *H04W 4/70* (2018.02); *H04L 65/1033* (2013.01)

(58) Field of Classification Search
USPC .......................................................... 709/223
See application file for complete search history.

(56) References Cited

U.S. PATENT DOCUMENTS

| | | | | |
|---|---|---|---|---|
| 2007/0150616 | A1* | 6/2007 | Baek | H04L 12/2803 709/246 |
| 2008/0064395 | A1* | 3/2008 | Sibileau | G08C 17/02 455/433 |
| 2008/0120422 | A1* | 5/2008 | Park | H04L 67/025 709/229 |
| 2009/0002219 | A1* | 1/2009 | Arling | G08C 17/02 341/176 |
| 2009/0007156 | A1 | 1/2009 | Baek et al. | |
| 2010/0231432 | A1 | 9/2010 | Shigei | |
| 2010/0256781 | A1* | 10/2010 | Sheu | H04L 67/125 700/3 |
| 2011/0102135 | A1* | 5/2011 | Ramsdell | G08C 17/02 340/5.8 |
| 2011/0134833 | A1* | 6/2011 | Gogic | H04W 52/0206 370/328 |
| 2011/0273625 | A1* | 11/2011 | McMahon | G06F 21/445 348/734 |
| 2012/0331156 | A1* | 12/2012 | Colpitts | H04L 12/2818 709/227 |
| 2013/0082827 | A1 | 4/2013 | Cho et al. | |
| 2014/0108637 | A1 | 4/2014 | Zhu | |
| 2014/0180447 | A1* | 6/2014 | Chen | G05B 15/02 700/90 |
| 2014/0181012 | A1 | 6/2014 | Min et al. | |
| 2014/0380234 | A1 | 12/2014 | Shim et al. | |
| 2015/0087278 | A1 | 3/2015 | Kim et al. | |
| 2015/0319552 | A1 | 11/2015 | Yang et al. | |

FOREIGN PATENT DOCUMENTS

| | | |
|---|---|---|
| CN | 102843251 A | 12/2012 |
| CN | 103095941 A | 5/2013 |
| CN | 103959737 A | 7/2014 |
| JP | 5473810 B2 | 4/2014 |
| KR | 1020110004154 A | 1/2011 |
| KR | 1020130035716 A | 4/2013 |
| KR | 10-2014-0045109 A | 4/2014 |
| KR | 1020140148289 A | 12/2014 |
| WO | 2013/174204 A1 | 11/2013 |
| WO | 2014092513 A1 | 6/2014 |
| WO | 2014178585 A1 | 11/2014 |

OTHER PUBLICATIONS

Communication dated Apr. 20, 2018, issued by the European Patent Office in counterpart European application No. 16800259.0.
Office Action issued on Chinese Patent Application No. 201680029475.0 dated Mar. 2, 2020.

* cited by examiner

ELECTRONIC APPARATUS, GATEWAY AND METHOD FOR CONTROLLING THE SAME

CROSS-REFERENCE TO RELATED APPLICATION(S)

This application claims priority from Korean Patent Application No. 10-2015-0072136, filed on May 22, 2015, in the Korean Intellectual Property Office, the disclosure of which is incorporated herein in its entirety by reference.

BACKGROUND

1. Technical Field

Apparatuses and methods consistent with exemplary embodiments relate to electronic apparatuses, gateways, and methods for controlling the same, and more specifically, to gateways managing networks, electronic apparatuses entering networks managed by gateways, and methods for controlling the gateways and the electronic devices.

2. Description of Related Art

Recently, Internet of things (IoT)-related technologies are being vigorously developed. The IoT is for an Internet connection between things, and virtually any device may be assigned Internet protocol (IP) addresses. For example, IP addresses, respectively, may be given to a proximity sensor and an illumination system in a home, and the proximity sensor and the illumination system may communicate with each other using their IP addresses. Accordingly, when a user moves from a first position to a second position in the home, the proximity sensor installed at the second position may sense the user's movement to the second position. The proximity sensor may transmit information on the user's movement to the illumination system, and the illumination system may turn on a light at the second position while turning off a light at the first position. As such, as multiple electronic devices may communicate with one another, various services may be offered.

Meanwhile, IoT-related techniques provide group operation functions. A related art group operation function is a scheme in which a gateway in a home network stores a group operation scenario, and when obtaining a group operation execute command, controls an electronic device in the network according to the group operation scenario. In other words, a gateway in a network is tightly coupled with a group operation function.

As described above, a related art group operation function is tightly coupled with a gateway in a network. Accordingly, the user cannot use a group operation command performed in a first network in a second network.

The above information is presented as background information only to assist with an understanding of the disclosure. No determination has been made, and no admission is made, as to whether any of the above might be applicable as prior art with regard to the disclosure.

SUMMARY

One or more exemplary embodiments provide an electronic apparatus and a gateway that may perform a group operation command independently from a network and a method for controlling the gateway and electronic device.

According to an aspect of an exemplary embodiment, provided is a method for controlling a controlled electronic device by using an electronic device, the method including: storing a group operation command including attribute information and operation information, the attribute information and the operation information corresponding to at least one controlled electronic device; and when the electronic device enters a network, transmitting the group operation command to at least one of a gateway, configured to manage the network, and at least one first controlled electronic device that is determined to correspond to the group operation command in the network, to perform an operation based on the operation information included in the group operation command.

According to an aspect of another exemplary embodiment, provided is an electronic apparatus, including: a communicator; a memory configured to store a group operation command including attribute information and operation information, the attribute information and the operation information corresponding to at least one controlled electronic device; and a processor configured to read program code stored in the memory and operate as instructed by the program code, wherein the program code is configured to cause the processor to, when the electronic apparatus enters a network, transmit, through the communicator, the group operation command to at least one of a gateway, configured to manage the network, and at least one first controlled electronic device that is determined to correspond to the group operation command in the network, to perform an operation based on the operation information included in the group operation command.

According to an aspect of still another exemplary embodiment, provided is a method for controlling a gateway that manages a network, the method including: receiving a group operation command including attribute information and operation information from an electronic device that enters the network, the attribute information and the operation information corresponding to at least one controlled electronic device; and transmitting the group operation command to at least one first controlled electronic device that is determined to correspond to the group operation command in the network, to perform an operation based on the operation information included in the group operation command.

According to an aspect of still another exemplary embodiment, a gateway managing a first network may include a communicator configured to receive a group operation command including attribute information and operation information, from an electronic device entering the first network, the attribute information and the operation information corresponding to at least one controlled electronic device, a memory, and a processor configured to read program code stored in the memory and operate as instructed by the program code, wherein the program code is configured to cause the processor to control the communicator to transmit the group operation command to each of at least one first controlled electronic device corresponding to the group operation command.

Other aspects, advantages, and salient features of exemplary embodiments will become apparent to those skilled in the art from the following detailed description, which, taken in conjunction with the annexed drawings, discloses exemplary embodiments of the disclosure.

BRIEF DESCRIPTION OF THE DRAWINGS

The above and/or other aspects will become more apparent by describing certain exemplary embodiments with reference to the accompanying drawings in which.

DETAILED DESCRIPTION

Figure 1:
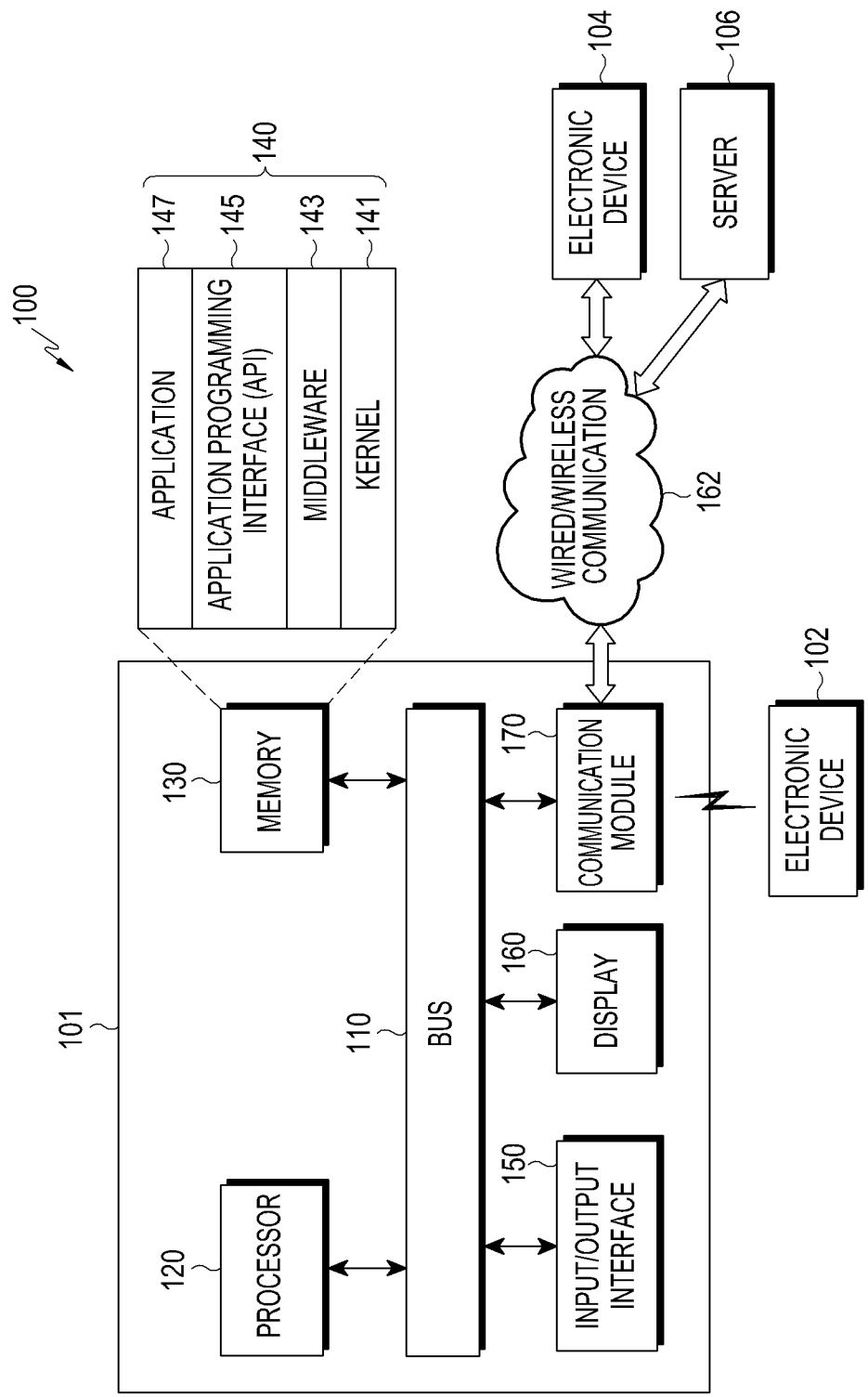
FIG. 1 is a block diagram illustrating an electronic device and a network according to an exemplary embodiment.

Hereinafter, exemplary embodiments are described with reference to the accompanying drawings. However, it should be appreciated that the disclosure is not limited to the exemplary embodiments, and all changes and/or equivalents or replacements thereto also belong to the scope. The same or similar reference denotations may be used to refer to the same or similar elements throughout the specification and the drawings.

As used herein, the terms "have," "may have," "include," or "may include" a feature (e.g., a number, function, operation, or a component such as a part) indicate the existence of the feature and do not exclude the existence of other features.

As used herein, the terms "A or B," "at least one of A and/or B," or "one or more of A and/or B" may include all possible combinations of A and B. For example, "A or B," "at least one of A and B," "at least one of A or B" may indicate all of (1) including at least one A, (2) including at least one B, or (3) including at least one A and at least one B.

As used herein, the terms "first" and "second" may modify various components regardless of importance and/or order and are used to distinguish a component from another without limiting the components. For example, a first user device and a second user device may indicate different user devices from each other regardless of the order or importance of the devices. For example, a first component may be denoted as a second component, and vice versa without departing from the scope of the disclosure.

It will be understood that when an element (e.g., a first element) is referred to as being (operatively or communicatively) "coupled with/to," or "connected with/to" another element (e.g., a second element), it can be coupled or connected with/to the other element directly or via a third element. In contrast, it will be understood that when an element (e.g., a first element) is referred to as being "directly coupled with/to" or "directly connected with/to" another element (e.g., a second element), no other element (e.g., a third element) intervenes between the element and the other element.

As used herein, the terms "configured (or set) to" may be interchangeably used with the terms "suitable for," "having the capacity to," "designed to," "adapted to," "made to," or "capable of" depending on circumstances. The term "configured (or set) to" does not essentially mean "specifically designed in hardware to." Rather, the term "configured to" may mean that a device can perform an operation together with another device or parts. For example, the term "processor configured (or set) to perform A, B, and C" may mean a generic-purpose processor (e.g., a central processing unit (CPU) or application processor) that may perform the operations by executing one or more software programs stored in a memory device or a dedicated processor (e.g., an embedded processor) for performing the operations.

The terms as used herein are provided merely to describe some exemplary embodiments thereof, but not to limit the scope of the disclosure. It is to be understood that the singular forms "a," "an," and "the" include plural references unless the context clearly dictates otherwise. The terms including technical and scientific terms used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some cases, the terms defined herein may be interpreted to exclude certain embodiments.

For example, examples of the electronic device according to exemplary embodiments may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MPEG audio layer-3 (MP3) player, a mobile medical device, a camera, or a wearable device. According to an exemplary embodiment, the wearable device may include at least one of an accessory-type device (e.g., a watch, a ring, a bracelet, an anklet, a necklace, glasses, contact lenses, or a head-mounted device (HMD)), a fabric- or clothes-integrated device (e.g., electronic clothes), a body attaching-type device (e.g., a skin pad or tattoo), or a body implantable device (e.g., an implantable circuit).

According to an exemplary embodiment, the electronic device may be a home appliance. For example, examples of the smart home appliance may include at least one of a television, a digital video disk (DVD) player, an audio player, a refrigerator, an air conditioner, a cleaner, an oven, a microwave oven, a washer, a drier, an air cleaner, a set-top box, a home automation control panel, a security control panel, a TV box (e.g., Samsung HomeSync™, Apple TV™, or Google TV™), a gaming console (Xbox™, PlayStation™) an electronic dictionary, an electronic key, a camcorder, or an electronic picture frame.

According to an exemplary embodiment, examples of the electronic device may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global navigation satellite system (GNSS) receiver, an event data recorder (EDR), a flight data recorder (FDR), an automotive infotainment device, an sailing electronic device (e.g., a sailing navigation device or a gyro compass), avionics, security devices, vehicular head units, industrial or home robots, automatic teller's machines (ATMs), point of sales (POS) devices, or Internet of Things devices (e.g., a bulb, various sensors, an electric or gas meter, a sprinkler, a fire alarm, a thermostat, a street light, a toaster, fitness equipment, a hot water tank, a heater, or a boiler).

According to various exemplary embodiments of the disclosure, examples of the electronic device may at least one of part of furniture or building/structure, an electronic board, an electronic signature receiving device, a projector, or various measurement devices (e.g., devices for measuring water, electricity, gas, or electromagnetic waves). According to an exemplary embodiment, the electronic device may be one or a combination of the above-listed devices. According to an exemplary embodiment, the electronic device may be a flexible electronic device. The electronic device disclosed herein is not limited to the above-listed devices, and may include new electronic devices depending on the development of technology.

Hereinafter, electronic devices are described with reference to the accompanying drawings, according to various embodiments. As used herein, the term "user" may denote a human or another device (e.g., an artificial intelligent electronic device) using the electronic device.

Referring to FIG. 1, according to an exemplary embodiment, an electronic device 101 is included in a network environment 100. The electronic device 101 may include a bus 110, a processor 120, a memory 130, an input/output interface 150, a display 160, and a communication module 170. In some embodiments, the electronic device 101 may not include at least one of the above components or may include another component.

The bus 110 may include a circuit for connecting the components 110 to 170 with one another and enabling communications (e.g., transferring control messages and/or data) between the components.

The processor 120 may include one or more of, for example, a central processing unit (CPU), an application processor (AP), or a communication processor (CP). The processor 120 may perform control on at least one of the components of the electronic device 101, and/or perform an operation or data processing relating to communication.

The memory 130 may include a volatile and/or non-volatile memory. For example, the memory 130 may store commands and/or data related to at least one component of the electronic device 101. According to an exemplary embodiment, the memory 130 may store software and/or a program 140. The program 140 may include, e.g., a kernel 141, middleware 143, an application programming interface (API) 145, and/or an application program (or "application") 147. At least a portion of the kernel 141, the middleware 143, or the API 145 may be denoted as an operating system (OS).

For example, the kernel 141 may control or manage system resources (e.g., the bus 110, the processor 120, or the memory 130) that are used to perform operations or functions implemented in the program 140 (e.g., the middleware 143, the API 145, or the application program 147). The kernel 141 may provide an interface that allows the middleware 143, the API 145, or the application 147 to access individual components of the electronic device 101 to control or manage the system resources.

The middleware 143 may function as a relay to allow the API 145 or the application 147 to communicate data with the kernel 141, for example.

Further, the middleware 143 may process one or more task requests received from the application program 147 according to an order of a priority thereof. For example, the middleware 143 may assign to at least one of application programs 147 a priority in using system resources (e.g., the bus 110, the processor 120, or the memory 130) of at least one electronic device 101. For example, the middleware 143 may perform scheduling or load balancing on the one or more task requests by processing the one or more task requests according to the priority assigned to the at least one application program 147.

The API 145 is an interface allowing the application 147 to control functions provided from the kernel 141 or the middleware 143. For example, the API 133 may include at least one interface or function (e.g., a command) for filing control, window control, image processing or text control.

The input/output interface 150 may serve as an interface that may, e.g., transfer commands or data input from a user or other external devices to other component(s) of the electronic device 101. Further, the input/output interface 150 may output commands or data received from other component(s) of the electronic device 101 to the user or the other external device.

The display 160 may include, e.g., a liquid crystal display (LCD), a light emitting diode (LED) display, an organic light emitting diode (OLED) display, or a microelectromechanical systems (MEMS) display, or an electronic paper display. The display 160 may display, e.g., various contents (e.g., text, images, videos, icons, or symbols) to the user. The display 160 may include a touchscreen and may receive, e.g., a touch, gesture, proximity or hovering input using an electronic pen or a body portion of the user.

For example, the communication module 170 may set up communication between the electronic device 101 and an external device (e.g., a first electronic device 102, a second electronic device 104, or a server 106). For example, the communication module 170 may be connected with the network 162 through wireless or wired communication to communicate with the external electronic device (e.g., the second external electronic device 104 or the server 106).

The wireless communication may be a cellular communication protocol and may use at least one of, e.g., long-term evolution (LTE), LTE-advanced (LTE-A), code division multiple access (CDMA), wideband CDMA (WCDMA), universal mobile telecommunications system (UMTS), wireless broadband (WiBro), or global system for mobile communications (GSM). Further, the wireless communication may include, e.g., short-range communication. The short-range communication may include at least one of wireless fidelity (Wi-Fi), Bluetooth, near-field communication (NFC), or global navigation satellite system (GNSS). The GNSS may include at least one of, e.g., global positioning system (GPS), global navigation satellite system (Glonass), Beidou navigation satellite system (hereinafter, "Beidou") or Galileo, or the European global satellite-based navigation system. Hereinafter, the terms "GPS" and the "GNSS" may be interchangeably used herein. The wired connection may include at least one of, e.g., universal serial bus (USB), high definition multimedia interface (HDMI), recommended standard (RS)-232, or plain old telephone service (POTS). The network 162 may include at least one of telecommunication networks, e.g., a computer network (e.g., local area network (LAN) or wide area network (WAN)), Internet, or a telephone network.

The first and second external electronic devices 102 and 104 may be a device of the same or a different type from the electronic device 101. According to an exemplary embodiment, the server 106 may include a group of one or more servers. According to an exemplary embodiment, all or some of operations executed on the electronic device 101 may be executed on another or multiple other electronic devices (e.g., the electronic devices 102 and 104 or the server 106). According to an exemplary embodiment, when the electronic device 101 needs to perform a certain function or service automatically or upon a request, the electronic device 101, in replacement of, or in addition to, executing the certain function or service, may request another device (e.g., electronic devices 102 and 104 or the server 106) to perform at least a function associated with the certain function or service. The other electronic device (e.g., electronic devices 102 and 104 or the server 106) may execute the requested function and transfer a result of the execution to the electronic device 101. The electronic device 101 may provide a requested function or service by processing the received result solely or additionally. To that end, a cloud computing, distributed computing, or client-server computing technique may be used, for example.

According to an exemplary embodiment, the processor 120 may be electrically connected to the display 160. Further, the processor 120 may be electrically connected to the memory 130. The memory 130 may store a group operation command including attribute information and operation information on each of at least one controlled electronic device. Further, the memory 130 may store an instruction executed to control the communication module so that, when the electronic device 101 enters a first network, the processor 120 transmits the group operation command to a gateway managing the first network or transmits the group operation command to each of at least one first controlled electronic device corresponding to the group operation command in the first network. Here, the gateway may be an electronic device managing a network that may be connected with the electronic device 101 via the wired/wireless communication 162. Further, the controlled electronic device may be an electronic device enrolled in a network managed by a gateway. Or, the controlled electronic device may be an electronic device that may directly communicate with the electronic device 101 via the wired/wireless communication 162.

According to an exemplary embodiment, the input/output interface 150 may receive at least one of attribute information and operation information on each of the at least one controlled electronic device included in the group operation command. The memory 130 may further store an instruction executed to enable the processor 120 to generate the group operation command based on at least one of the received attribute information and the operation information on each of the at least one controlled electronic device.

According to an exemplary embodiment, the memory 130 may further store an instruction executed to enable the processor 120 to perform an authentication procedure to control the at least one controlled electronic device. The attribute information may be classified as per operation functions of the at least one controlled electronic device. The group operation command may further include information on an operation time of each of the at least one controlled electronic device.

According to an exemplary embodiment, the memory 130 may further store an instruction executed to enable the processor 120 to determine the at least one first controlled electronic device based on the attribute information included in the group operation command.

The gateway may manage the first network. The gateway may include a communication module, a memory, and a processor. The communication module of the gateway may receive the group operation command including the attribute information and operation information on each of the at least one controlled electronic device from an electronic device entering the first network. The memory of the gateway may store an instruction executed to control the communication module so that the processor of the gateway transmits the group operation command including the operation information to each of the at least one first controlled electronic device corresponding to the group operation command.

According to an exemplary embodiment, the communication module of the gateway may receive attribute information on each of at least one electronic device in the first network.

According to an exemplary embodiment, the memory of the gateway may further store an instruction executed to enable the processor of the gateway to compare attribute information on at least one electronic device in the first network with attribute information included in the group operation command and to determine the at least one first controlled electronic device based on a result of the comparison.

According to an exemplary embodiment, the communication module of the gateway may receive attribute information on each of at least one electronic device in the first network in a process of enrolling at least one electronic device in the first network in the first network.

According to an exemplary embodiment, the memory of the gateway may further store an instruction executed to enable the processor of the gateway to send a request for attribute information on each of at least one electronic device in the first network in response to reception of the group operation command.

According to an exemplary embodiment, the memory of the gateway may further store an instruction executed to enable the processor of the gateway to perform an authentication procedure to control the at least one controlled electronic device. The attribute information may be classified as per operation functions of the at least one controlled electronic device. The group operation command may further include information on an operation time of each of the at least one controlled electronic device.

Figure 2:
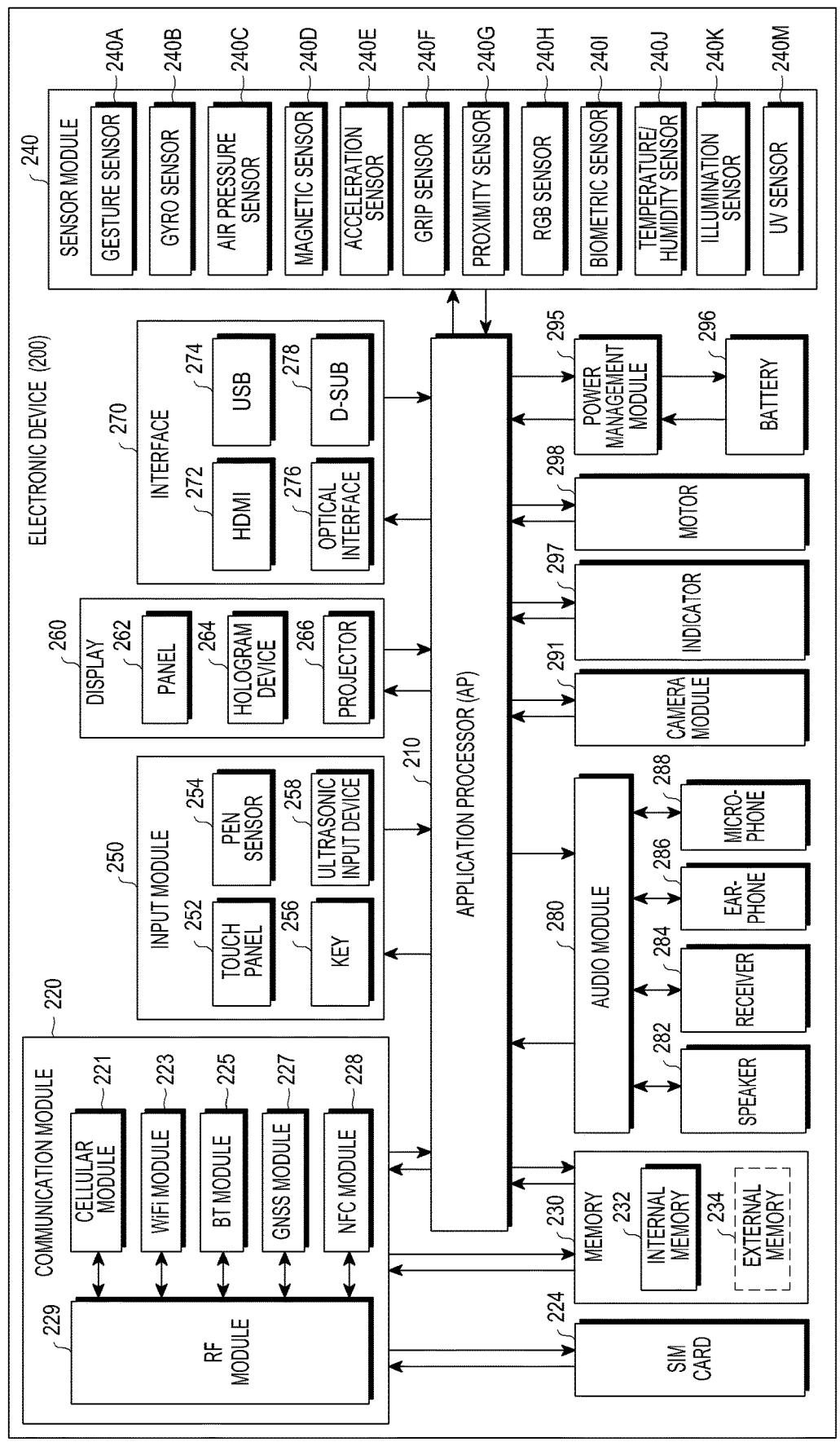
FIG. 2 is a block diagram illustrating an electronic device according to an exemplary embodiment.

FIG. 2 is a block diagram illustrating an electronic device 201 according to an exemplary embodiment. The electronic device 201 may include all or part of the configuration of, e.g., the electronic device 101 shown in FIG. 1. The electronic device 201 may include one or more processors (e.g., application processors (APs)) 210, a communication module (or a communicator) 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298.

The processor 210 may control multiple hardware and software components connected to the processor 210 by running, e.g., an operating system or application programs, and the processor 210 may process and compute various data. The processor 210 may be implemented in, e.g., a system on chip (SoC). According to an exemplary embodiment, the processor 210 may further include a graphic processing unit (GPU) and/or an image signal processor. The processor 210 may include at least one (e.g., the cellular module 221) of the components shown in FIG. 2. The processor 210 may load a command or data received from at least one of other components (e.g., a non-volatile memory) on a volatile memory, process the command or data, and store various data in the non-volatile memory.

The communication module 220 may have the same or similar configuration to the communication module 170 of FIG. 1. The communication module 220 may include, e.g., a cellular module 221, a Wi-Fi module 223, a Bluetooth module 225, a GNSS module 227 (e.g., a GPS module, a Glonass module, a Beidou module, or a Galileo module), an NFC module 228, and a radio frequency (RF) module 229.

The cellular module 221 may provide voice call, video call, text, or Internet services through, e.g., a communication network. The cellular module 221 may perform identification or authentication on the electronic device 201 in the communication network using a subscriber identification module 224 (e.g., the SIM card). According to an exemplary embodiment, the cellular module 221 may perform at least some of the functions providable by the processor 210. According to an exemplary embodiment, the cellular module 221 may include a communication processor (CP).

The Wi-Fi module 223, the Bluetooth module 225, the GNSS module 227, or the NFC module 228 may perform a process for, e.g., processing data communicated through the module. At least some (e.g., two or more) of the cellular module 221, the Wi-Fi module 223, the Bluetooth module 225, the GNSS module 227, or the NFC module 228 may be included in a single integrated circuit (IC) or an IC package.

The RF module 229 may communicate data, e.g., communication signals (e.g., RF signals). The RF module 229 may include, e.g., a transceiver, a power amp module (PAM), a frequency filter, an LNA (low noise amplifier), or an antenna. According to an exemplary embodiment, at least one of the cellular module 221, the Wi-Fi module 223, the Bluetooth module 225, the GNSS module 227, or the NFC module 228 may communicate RF signals through a separate RF module.

The subscription identification module 224 may include, e.g., a card including a subscriber identification module and/or an embedded SIM, and may contain unique identification information (e.g., an integrated circuit card identifier (ICCID) or subscriber information (e.g., an international mobile subscriber identity (IMSI)).

The memory 230 (e.g., the memory 130) may include, e.g., an internal memory 232 or an external memory 234. The internal memory 232 may include at least one of, e.g., a volatile memory (e.g., a dynamic random access memory (DRAM), a static RAM (SRAM), a synchronous dynamic RAM (SDRAM), etc.) or a non-volatile memory (e.g., a one time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash, or a NOR flash), a hard drive, or a solid state drive (SSD).

The external memory 234 may include a flash drive, e.g., a compact flash (CF) memory, a secure digital (SD) memory, a micro-SD memory, a min-SD memory, an extreme digital (xD) memory, a multi-media card (MMC), or a memory Stick™. The external memory 234 may be functionally and/or physically connected with the electronic device 201 via various interfaces.

For example, the sensor module 240 may measure a physical quantity or detect an operational state of the electronic device 201, and the sensor module 240 may convert the measured or detected information into an electrical signal. The sensor module 240 may include at least one of, e.g., a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (e.g., an red-green-blue (RGB) sensor, a bio sensor 240I, a temperature/humidity sensor 240J, an illumination sensor 240K, or an ultra violet (UV) sensor 240M. Additionally or alternatively, the sensing module 240 may include, e.g., an E-nose sensor, an electromyography (EMG) sensor, an electroencephalogram (EEG) sensor, an electrocardiogram (ECG) sensor, an infrared (IR) sensor, an iris sensor, or a finger print sensor. The sensor module 240 may further include a control circuit for controlling at least one or more of the sensors included in the sensing module 240. According to an exemplary embodiment, the electronic device 201 may further include a processor configured to control the sensor module 240 as part of the processor 210 or separately from the processor 210, and the electronic device 201 may control the sensor module 240 while the processor 210 is in a sleep mode.

The input unit 250 may include, e.g., a touch panel 252, a (digital) pen sensor 254, a key 256, or an ultrasonic input device 258. The touch panel 252 may use at least one of capacitive, resistive, infrared, or ultrasonic methods. The touch panel 252 may further include a control circuit. The touch panel 252 may further include a tactile layer and may provide a user with a tactile reaction.

The (digital) pen sensor 254 may include, e.g., a part of a touch panel or a separate sheet for recognition. The key 256 may include e.g., a physical button, optical key or key pad. The ultrasonic input device 258 may sense an ultrasonic wave generated from an input tool through a microphone (e.g., the microphone 288) to identify data corresponding to the sensed ultrasonic wave.

The display 260 (e.g., the display 160) may include a panel 262, a hologram device 264, or a projector 266. The panel 262 may have the same or similar configuration to the display 160 of FIG. 1. The panel 262 may be implemented to be flexible, transparent, or wearable. The panel 262 may also be integrated with the touch panel 252. The hologram device 264 may generate three dimensional (3D) images (holograms) in the air by using light interference. The projector 266 may display an image by projecting light onto a screen. The screen may be, for example, located inside or outside of the electronic device 201. In accordance with an exemplary embodiment, the display 260 may further include a control circuit to control the panel 262, the hologram device 264, or the projector 266.

The interface 270 may include e.g., a high definition multimedia interface (HDMI) 272, a USB 274, an optical interface 276, or a D-subminiature (D-sub) 278. The interface 270 may be included in e.g., the communication interface 170 shown in FIG. 1. Additionally or alternatively, the interface 270 may include a mobile high-definition link (MHL) interface, a secure digital (SD) card/multimedia card (MMC) interface, or infrared data association (IrDA) standard interface.

The audio module 280 may convert a sound into an electric signal or vice versa, for example. At least a part of the audio module 280 may be included in e.g., the input/output interface 150 as shown in FIG. 1. The audio module 280 may process sound information input or output through e.g., a speaker 282, a receiver 284, an earphone 286, or a microphone 288.

For example, the camera module 291 may be a device for capturing still images and videos, and may include, according to an exemplary embodiment, one or more image sensors (e.g., front and back sensors), a lens, an image signal processor (ISP), or a flash such as a light emitting diode (LED) or a xenon lamp.

The power manager module 295 may manage power of the electronic device 201, for example. Although not shown, according to an exemplary embodiment, the power manager module 295 may include a power management integrated circuit (PMIC), a charger IC, or a battery or fuel gauge. The PMIC may have a wired and/or wireless recharging scheme. The wireless charging scheme may include e.g., a magnetic resonance scheme, a magnetic induction scheme, or an electromagnetic wave based scheme, and an additional circuit, such as a coil loop, a resonance circuit, a rectifier, or the like may be added for wireless charging. The battery gauge may measure an amount of remaining power of the battery 296, a voltage, a current, or a temperature while the battery 296 is being charged. The battery 296 may include, e.g., a rechargeable battery or a solar battery.

The indicator 297 may indicate a particular state of the electronic device 201 or a part (e.g., the processor 210) of the electronic device, including e.g., a booting state, a message state, or recharging state. The motor 298 may convert an electric signal to a mechanical vibration and may generate a vibrational or haptic effect. Although not shown, a processing unit for supporting mobile television (TV), such as a graphic processing unit (GPU) may be included in the electronic device 201. The processing unit for supporting mobile TV may process media data conforming to a standard for digital multimedia broadcasting (DMB), digital video broadcasting (DVB), or mediaFlo™.

Each of the aforementioned components of the electronic device 201 may include one or more parts, and a name of the part may vary according to a type of the electronic device. The electronic device in accordance with various exemplary embodiments may include at least one of the aforementioned components, omit some of them, or include other additional component(s). Some of the components may be combined into an entity, but the entity may perform the same functions as those performed by the components.

Figure 3:
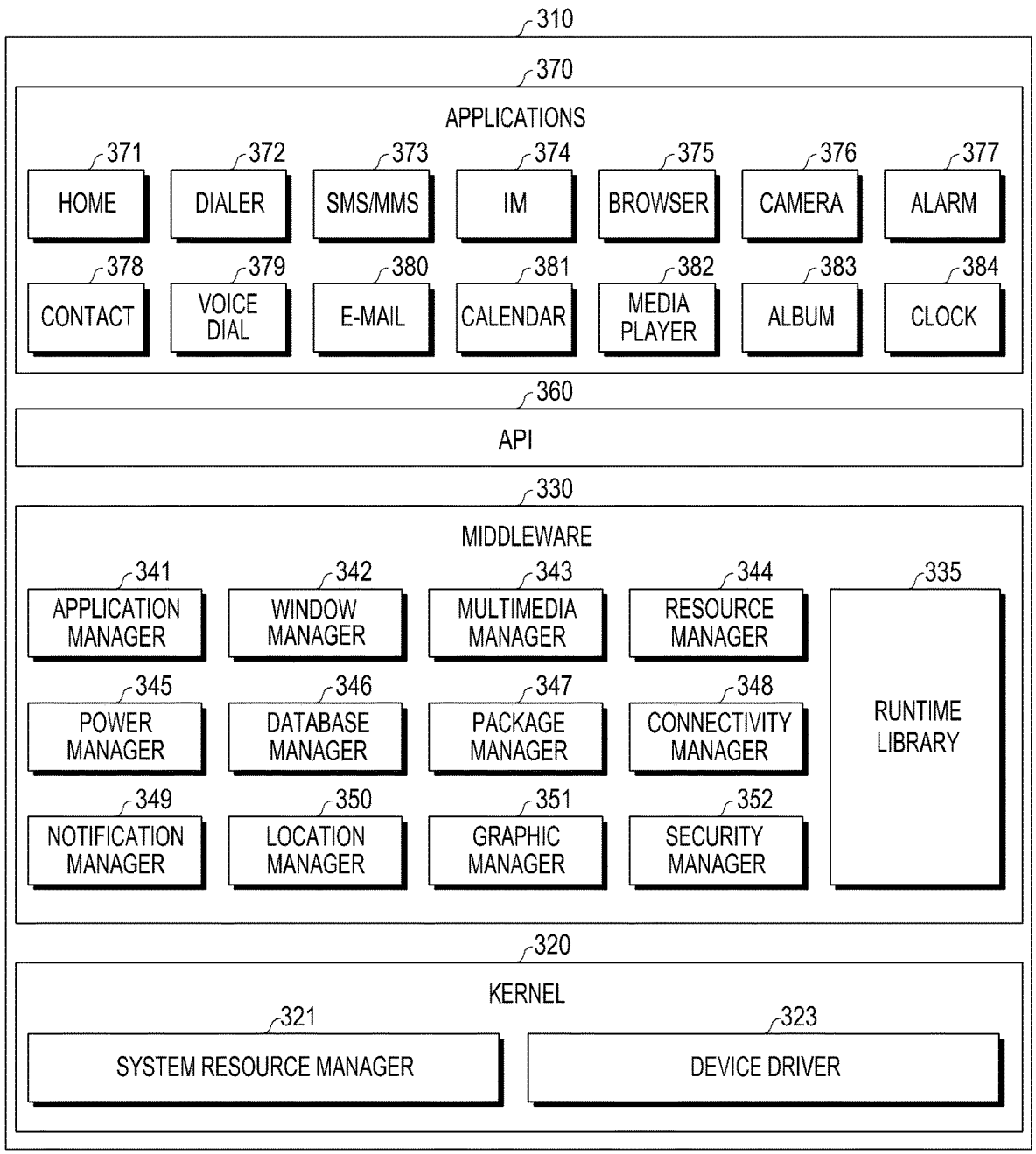
FIG. 3 is a block diagram illustrating a program module according to an exemplary embodiment.

FIG. 3 is a block diagram illustrating a program module according to an exemplary embodiment. According to an exemplary embodiment, a program module 310 (e.g., the program 140) may include an operating system (OS) controlling resources related to the electronic device (e.g., the electronic device 101) and/or various applications (e.g., the application processor 147) driven on the operating system. The operating system may include, e.g., Android, iOS, Windows, Symbian, Tizen, or Bada.

The program 310 may include, e.g., a kernel 320, middleware 330, an application programming interface (API) 360, and/or an application 370. At least a part of the program module 310 may be preloaded on the electronic device or may be downloaded from an external electronic device (e.g., the electronic devices 102 and 104 or the server 106).

The kernel 320 (e.g., the kernel 141) may include, e.g., a system resource manager 321 and/or a device driver 323. The system resource manager 321 may perform control, allocation, or recovery of system resources. According to an exemplary embodiment, the system resource manager 321 may include a process managing unit, a memory managing unit, or a file system managing unit. The device driver 323 may include, e.g., a display driver, a camera driver, a Bluetooth driver, a shared memory driver, a USB driver, a keypad driver, a Wi-Fi driver, an audio driver, or an inter-process communication (IPC) driver.

The middleware 330 may provide various functions to the application 370 through the API 360 so that the application 370 may efficiently use limited system resources in the electronic device or provide functions jointly required by applications 370. According to an exemplary embodiment, the middleware 330 (e.g., middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 may include a library module used by a compiler in order to add a new function through a programming language while, e.g., the application 370 is being executed. The runtime library 335 may perform input/output management, memory management, or operation on arithmetic functions.

The application manager 341 may manage the life cycle of at least one application of, e.g., the applications 370. The window manager 342 may manage GUI resources used on the screen. The multimedia manager 343 may grasp formats to be used to play various media files and use a codec appropriate for a format to perform encoding or decoding on media files. The resource manager 344 may manage resources, such as source code of at least one of the applications 370, memory or storage space.

The power manager 345 may operate together with, e.g., a basic input/output system (BIOS) to manage battery or power and provide power information used for operating the electronic device. The database manager 346 may generate, search, or vary a database to be used in at least one of the applications 370. The package manager 347 may manage installation or update of an application that is distributed in the form of a package file.

The connectivity manager 348 may manage wireless connectivity, such as, e.g., Wi-Fi or Bluetooth. The notification manager 349 may display or notify an event, such as a coming message, appointment, or proximity notification, of the user without interfering with the user. The location manager 350 may manage locational information on the electronic device. The graphic manager 351 may manage graphic effects to be offered to the user and their related user interface. The security manager 352 may provide various security functions used for system security or user authentication. According to an exemplary embodiment, when the electronic device (e.g., the electronic device 101) has telephony capability, the middleware 330 may further include a telephony manager for managing voice call or video call functions of the electronic device.

The middleware 330 may include a middleware module forming a combination of various functions of the above-described components. The middleware 330 may provide a specified module per type of the operating system in order to provide a differentiated function. Further, the middleware 330 may dynamically omit some existing components or add new components.

The API 360 (e.g., the API 145) may be a set of, e.g., API programming functions and may have different configurations depending on operating systems. For example, in the case of Android or iOS, one API set may be provided per platform, and in the case of Tizen, two or more API sets may be offered per platform.

The application 370 (e.g., the application processor 147) may include one or more applications that may provide functions such as, e.g., a home 371, a dialer 372, a short message service (SMS)/multimedia messaging service (MMS) 373, an instant message (IM) 374, a browser 375, a camera 376, an alarm 377, a contact 378, a voice dial 379, an email 380, a calendar 381, a media player 382, an album 383, or a clock 384, a health-care (e.g., measuring the degree of workout or blood sugar), or provision of environmental information (e.g., provision of air pressure, moisture, or temperature information).

According to an exemplary embodiment, the application 370 may include an application (hereinafter, "information exchanging application" for convenience) supporting information exchange between the electronic device (e.g., the electronic device 101) and an external electronic device (e.g., the electronic device 102 or 104). Examples of the information exchange application may include, but is not limited to, a notification relay application for transferring specific information to the external electronic device, or a device management application for managing the external electronic device.

For example, the notification relay application may include a function for relaying notification information generated from other applications of the electronic device (e.g., the SMS/MMS application, email application, health-care application, or environmental information application) to the external electronic device (e.g., the electronic devices 102 and 104). Further, the notification relay application may receive notification information from, e.g., the external electronic device and may provide the received notification information to the user.

The device management application may perform at least some functions of the external electronic device (e.g., the electronic device 102 or 104) communicating with the electronic device (for example, turning on/off the external electronic device or some components of the external electronic device or control of brightness (or resolution) of the display), and the device management application may manage (e.g., install, delete, or update) an application operating in the external electronic device or a service (e.g., call service or message service) provided from the external electronic device.

According to an exemplary embodiment, the application 370 may include an application (e.g., a healthcare application of a mobile medical device) designated according to an attribute of the external electronic device (e.g., the electronic device 102 or 104). According to an exemplary embodiment, the application 370 may include an application received from the external electronic device (e.g., the server 106 or electronic device 102 or 104). According to an exemplary embodiment, the application 370 may include a preloaded application or a third party application downloadable from a server. The names of the components of the program module 310 according to the above described exemplary embodiment may be varied depending on the type of operating system.

According to an exemplary embodiment, at least a part of the program module 310 may be implemented in software, firmware, hardware, or in a combination of two or more thereof. At least a part of the programming module 310 may be implemented (e.g., executed) by e.g., a processor (e.g., the processor 210). At least a part of the program module 310 may include e.g., a module, program, routine, set of instructions, process, or the like for performing one or more functions.

Figure 4A:
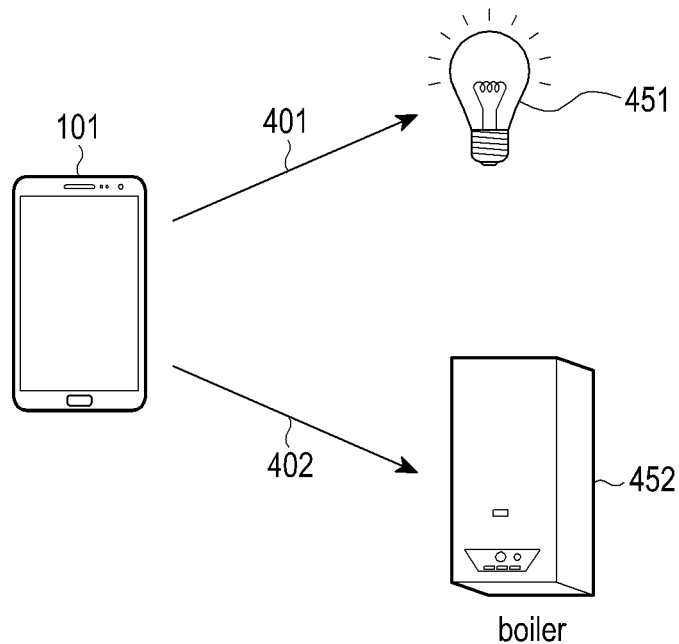
FIGS. 4A and 4B are concept views illustrating a group operation according to an exemplary embodiment.
Figure 4B:
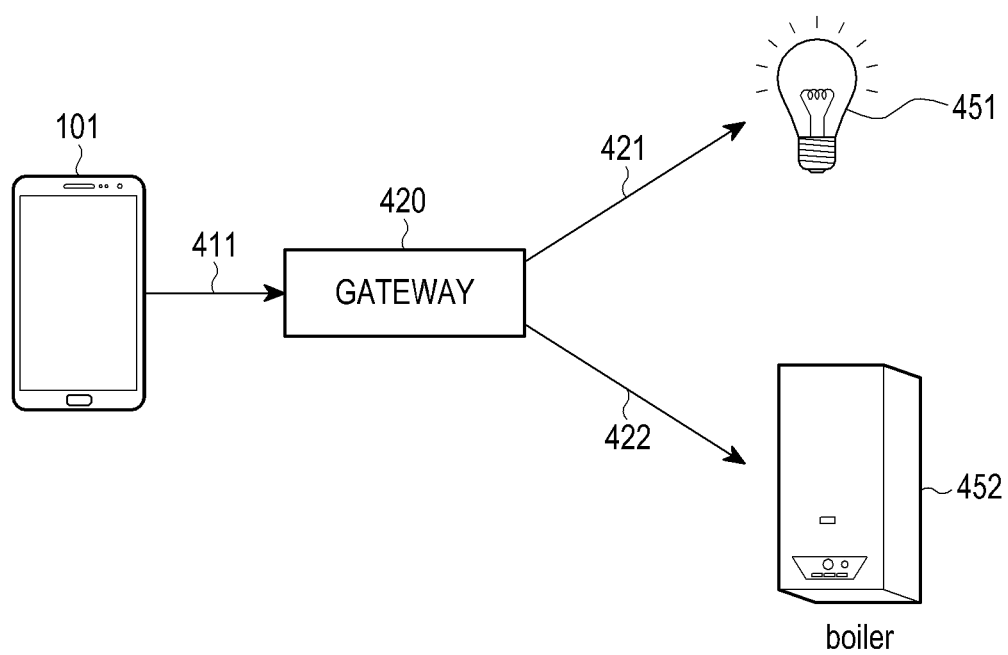

FIGS. 4A and 4B are concept views illustrating a group operation according to an exemplary embodiment.

As shown in FIG. 4A, the electronic device 101 may communicate with at least one of controlled electronic devices 451 and 452. The electronic device 101 may communicate with at least one of the controlled electronic devices 451 and 452 through a communication module. The electronic device 101 may communicate with the at least one of the controlled electronic devices 451 and 452 by various communication schemes that are not particularly limited. The electronic device 101 may communicate with the at least one of the controlled electronic devices 451 and 452 using a constrained application protocol (CoAP). As shown in FIGS. 4A and 4B, the first controlled electronic device 451 may be a small-sized electronic device, e.g., an electric light, and may have difficulty in storing the overall hypertext transfer protocol (HTTP) stack in the communication module. Accordingly, at least one of the at least one of the controlled electronic devices 451 and 452 and the electronic device 101 may perform communication using a CoAP proposed by various IoT standard-related organizations. The type of CoAP is not limited.

As shown in FIG. 4A, the electronic device 101 may transmit an operation command 401 to the first controlled electronic device 451 and an operation command 402 to the second controlled electronic device 452. According to an exemplary embodiment, the operation commands 401 and 402 may include attribute information and operation information on the first controlled electronic device 451. Here, the attribute information may be classified as per operation functions of the controlled electronic device. Examples of the attribute information are shown in the following Table 1 according to an exemplary embodiment.

TABLE 1

| Attribute information | Type of controlled electronic device |
|---|---|
| Lighting device | Fluorescent light, incandescent light, curtain open/close system, stand light |
| Media device | TV, audio player, CD player, MP3 player, radio |
| Room heating/cooling device | Air conditioner, boiler, window open/close system |

As set forth in Table 1, the attribute information may have categories that may be classified as per operation functions of the electronic device. For example, the attribute information on the 'lighting device' may include attribute information on various controlled electronic devices, such as an incandescent light, curtain open/close system, or stand light. Various controlled electronic devices may receive and store the attribute information. For example, a controlled electronic device may, when manufactured, store the attribute information according to a standard or may obtain and store the attribute information from an application that is installed thereon. In the exemplary embodiment shown in FIG. 4A, it is assumed that the first controlled electronic device 451 includes attribute information on a lighting device, and the second controlled electronic device 452 includes attribute information on a room heating/cooling device.

In the exemplary embodiment shown in FIG. 4A, the electronic device 101 may store group operation commands as set forth in Table 2, for example.

TABLE 2

| Attribute information | Operation information |
|---|---|
| Lighting device | Turn on |
| Room heating/cooling device | Adjust temperature to 24° C. |

As shown in Table 2, according to an exemplary embodiment, a group operation command may include attribute information and operation information, e.g., attribute information and operation information on each of at least one controlled electronic device.

In the exemplary embodiment shown in FIG. 4A, the electronic device 101 may transmit group operation commands 401 and 402 to the first controlled electronic device 451 and the second controlled electronic device 452, respectively. The electronic device 101 may transmit the group operation commands 401 and 402 when entering a first network including the first controlled electronic device 451 and the second controlled electronic device 452.

In an exemplary embodiment, the electronic device 101 may broadcast the group operation commands 401 and 402 when entering the first network. Alternatively, the electronic device 101 may obtain attribute information from each of the first controlled electronic device 451 and the second controlled electronic device 452 when entering the first network. The electronic device 101 may compare the attribute information, which is included in the group operation commands 401 and 402 to be transmitted, with the attribute information obtained from each of the first controlled electronic device 451 and the second controlled electronic device 452 to determine a controlled electronic device to which the group operation commands 401 and 402 are to be transmitted. The above process is described below in greater detail.

The first controlled electronic device 451 and the second controlled electronic device 452 may receive the group operation commands 401 and 402 from the electronic device 101. The first controlled electronic device 451 may compare the attribute information in the group operation commands 401 and 402 with its own attribute information and may perform an operation corresponding to the attribute information. For example, when receiving the group operation command as shown in Table 2, the first controlled electronic device 451 may perform an operation 'turn on' corresponding to the attribute information on the 'lighting device' in the group operation command. The first controlled electronic device 451 may compare its attribute information with the attribute information in the group operation command to perform the corresponding operation. When the group operation command does not include attribute information identical to the attribute information corresponding to the controlled electronic device, the controlled electronic device may disregard the received group operation command or may perform operation corresponding to pseudo attribute information. The second controlled electronic device 452 may receive a group operation command as shown in Table 2 to perform the operation of temperature adjustment to 24° C. corresponding to the attribute information on the 'room heating/cooling device' that is consistent with (or matches) its attribute information.

As described above, the electronic device 101 may enter the first network to transmit the group operation commands to the controlled electronic devices 451 and 452 in the first network. The controlled electronic devices 451 and 452 in the first network may perform an operation corresponding to attribute information in the group operation command that is consistent with their attribute information. Accordingly, the electronic device 101 may perform control so that a group operation command valid in a particular network may be performed in another network. In other words, the electronic device 101 may transmit a group operation command independent from the network.

According to an exemplary embodiment, the electronic device 101 may receive a group operation command from another electronic device. In other words, the electronic device 101 may perform an operation of copying a group operation command from another electronic device. For example, the electronic device 101 may obtain a group operation command using a discovery or Get method.

FIG. 4B is a concept view illustrating an operation of a gateway according to an exemplary embodiment.

The electronic device 101 may enter a first network managed by a gateway 420. The gateway 420 may control a controlled electronic device included in the first network and may perform enrollment/disenrollment from the first network. The gateway 420 may receive a group operation command 411 from the electronic device 101 entering the first network. The electronic device 101 may communicate with the gateway 420 based on various communication schemes and may transmit a group operation command 411 to the gateway 420.

The gateway 420 may transmit the group operation command 411 to the controlled electronic devices 451 and 452 corresponding to the received group operation command 411. The gateway 420 may obtain and store attribute information on the controlled electronic devices 451 and 452 at the time of enrollment or may inquire, obtain and store the attribute information at the time of the reception of the group operation command 411. The gateway 420 may compare the attribute information included in the group operation command 411 with the attribute information on the controlled electronic device. The gateway 420 may transmit group operation commands 421 and 422 to the controlled electronic devices 451 and 452 that are consistent with the attribute information included in the group operation command 411. For example, when receiving a group operation command as shown in Table 2, the gateway 420 may identify 'lighting device' and 'room heating/cooling device' that are attribute information included in the group operation command. The gateway 420 may transmit the group operation command 421 to the first controlled electronic device 451 having the attribute of the 'lighting device' in the network. The gateway 420 may transmit the group operation command 422 to the second controlled electronic device 452 having the attribute of the 'room heating/cooling device' in the network. The first controlled electronic device 451 may perform according to the operation information of 'turn on' that corresponds to the attribute information on the 'lighting device' in the group operation command 421. The second controlled electronic device 452 may perform according to the operation information of 'adjust temperature to 24° C.' that corresponds to the attribute information on the 'room heating/cooling device' in the group operation command 422. According to an exemplary embodiment, the gateway 420 may transmit only the operation information of 'turn on' to the first controlled electronic device 451 and transmit only the operation information of 'adjust temperature to 24° C.' to the second controlled electronic device 452.

Figure 5:
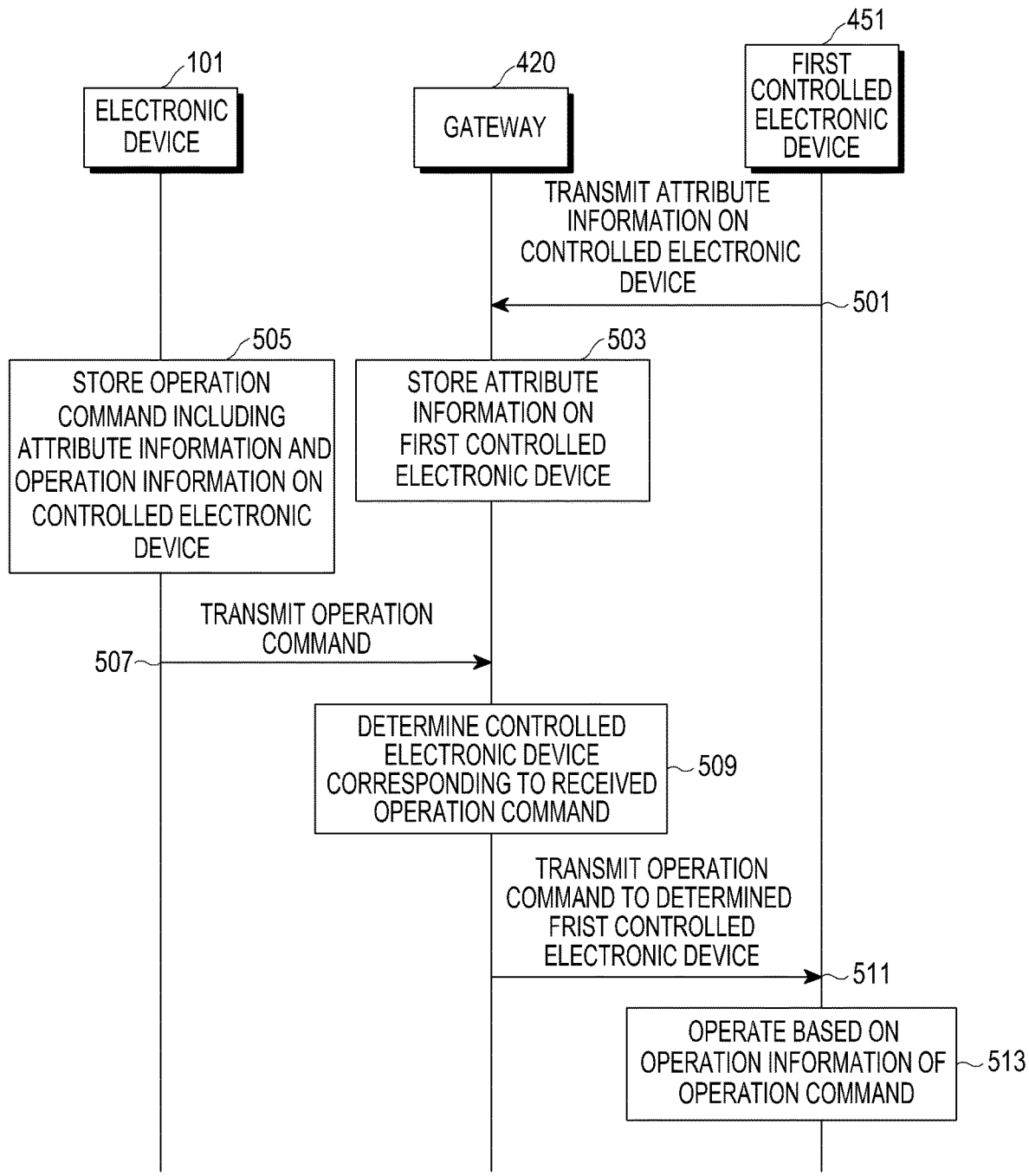
FIG. 5 is a flowchart illustrating an example of performing a group operation command according to an exemplary embodiment.

FIG. 5 is a flowchart illustrating an example of performing a group operation command according to an exemplary embodiment. As in the exemplary embodiment shown in FIG. 5, the electronic device 101 may transmit an operation command including attribute information and operation information on a single controlled electronic device, according to an exemplary embodiment. According to an exemplary embodiment, a group operation command may include operation information on a plurality of controlled electronic devices or operation information on a single controlled electronic device.

In operation 501, the first controlled electronic device 451 may transmit attribute information on the first controlled electronic device 451 to the gateway 420. As described above, the first controlled electronic device 451 may receive and store the attribute information at the time of manufacture or may determine and store the attribute information on the first electronic device 451 through an application that is run after the time of manufacture. The first controlled electronic device 451 may determine and store the attribute information based on a user input. The first controlled electronic device 451 may transmit the attribute information to the gateway 420 while enrolling in a network managed by the gateway 420. The communication of the attribute information may be included in the process of enrolling in the network managed by the gateway 420. Or, the gateway 420 may send a request for the attribute information to the first controlled electronic device 451, and the first controlled electronic device 451 may transmit the attribute information in response to the request.

In operation 503, the gateway 420 may store the attribute information on the controlled electronic device in the network. The gateway 420 may store the attribute information on the controlled electronic device received in operation 501 in the form of a lookup table or database. According to an exemplary embodiment, the gateway 420 may store the attribute information on the controlled electronic device in the network as shown in Table 3, for example.

TABLE 3

| Controlled electronic device in network | Attribute information |
|---|---|
| First controlled electronic device | Lighting device |
| Second controlled electronic device | Room heating/cooling device |

In the attribute information as shown in Table 3, there is no limitation on identifiers for the controlled electronic devices, such as the first controlled electronic device and the second controlled electronic device, as long as the identifiers are information to identify the electronic device, such as an intra-network identifier, a user identifier (UID), a uniform resource locator (URL), a medium access control (MAC) address, an Internet protocol (IP) address, or information to identify access information on the electronic device.

In operation 505, the electronic device 101 may store the operation command including the attribute information and the operation information on the controlled electronic device. The electronic device 101 may generate and store the operation command based on a user input or may receive the operation command from another electronic device. For example, the electronic device 101 may store an operation command including the attribute information on the 'lighting device' and the operation information of 'turn on.'

In operation 507, the electronic device 101 may transmit the operation command to the gateway 420. The electronic device 101 may transmit the operation command when entering the network managed by the gateway 420 or may transmit the operation command to the gateway 420 in the process of enrolling in the network. Or, the electronic device 101 may transmit the operation command in response to an input of an operation command from the user after enrolling in the network.

In operation 509, the electronic device 101 may determine a controlled electronic device corresponding to the received operation command. For example, when receiving an operation command including the operation information of 'turn on' and the attribute information on the 'lighting device,' the electronic device 101 may determine the first controlled electronic device 451 having the attribute information corresponding to the 'lighting device' that is the attribute information included in the operation command.

In operation 511, the gateway 420 may transmit an operation command to the determined first controlled electronic device 451. Alternatively, the gateway 420 may transmit only the operation information in the operation command to the determined first controlled electronic device 451.

In operation 513, the first controlled electronic device 451 may operate based on the operation information in the operation command. When receiving only the operation information, the first controlled electronic device 451 may operate based on the operation information.

Figure 6:
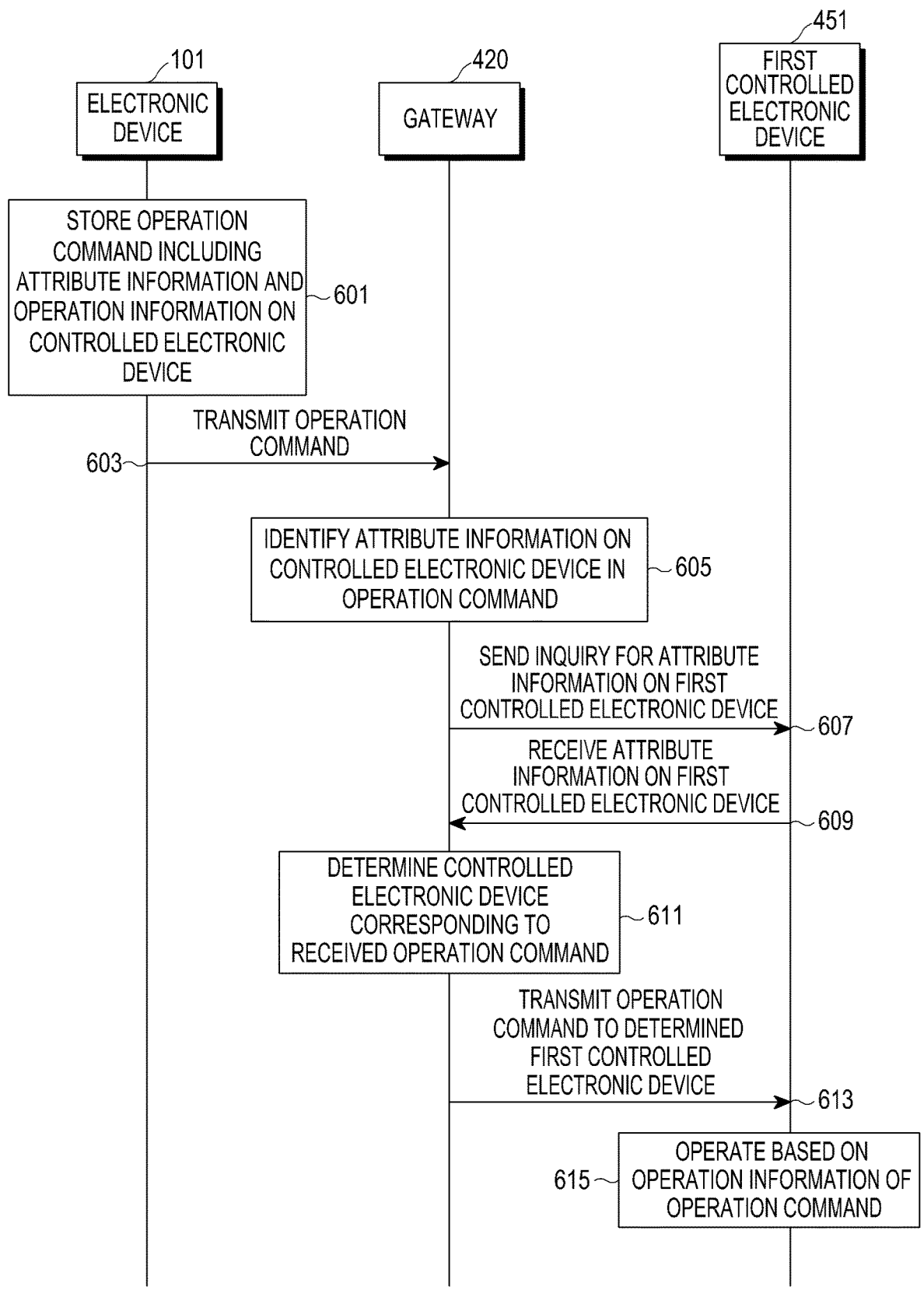
FIG. 6 is a flowchart illustrating an example of performing according to a group operation command according to an exemplary embodiment.

FIG. 6 is a flowchart illustrating an example of performing according to a group operation command according to an exemplary embodiment.

In operation 601, the electronic device 101 may store an operation command including attribute information and operation information on a controlled electronic device. As described above, the electronic device 101 may generate and store the operation command based on a user input or may receive the operation command from another electronic device. For example, the electronic device 101 may store an operation command including the attribute information on the 'lighting device' and the operation information of 'turn on.'

In operation 603, the electronic device 101 may transmit the operation command to the gateway 420. The electronic device 101 may transmit the operation command when entering the network managed by the gateway 420 or may transmit the operation command to the gateway 420 in the process of enrolling in the network. Or, the electronic device 101 may transmit the operation command in response to an input of an operation command from the user after enrolling in the network.

In operation 605, the gateway 420 may identify the attribute information on the controlled electronic device in the operation command. For example, the gateway 420 may identify that the attribute information in the operation command is 'lighting device.'

In operation 607, the gateway 420 may inquire about attribute information on all of the controlled electronic devices in the network. In operation 609, the gateway 420 may receive attribute information from all of the controlled electronic devices in the network.

In operation 611, the gateway 420 may determine a controlled electronic device corresponding to the received operation command among all of the controlled electronic devices in the network. For example, the gateway 420 may receive the attribute information on the 'lighting device' from the first controlled electronic device 451. The gateway 420 may determine that the controlled electronic device corresponding to the attribute information on the 'lighting device' in the operation command is the first controlled electronic device 451.

In operation 613, the gateway 420 may transmit the operation command to the determined controlled electronic device. In operation 615, the first controlled electronic device 451 may operate based on the operation information in the received operation command. For example, the first controlled electronic device 451 may turn on based on the 'turn on' operation information in the operation command.

Figure 7:
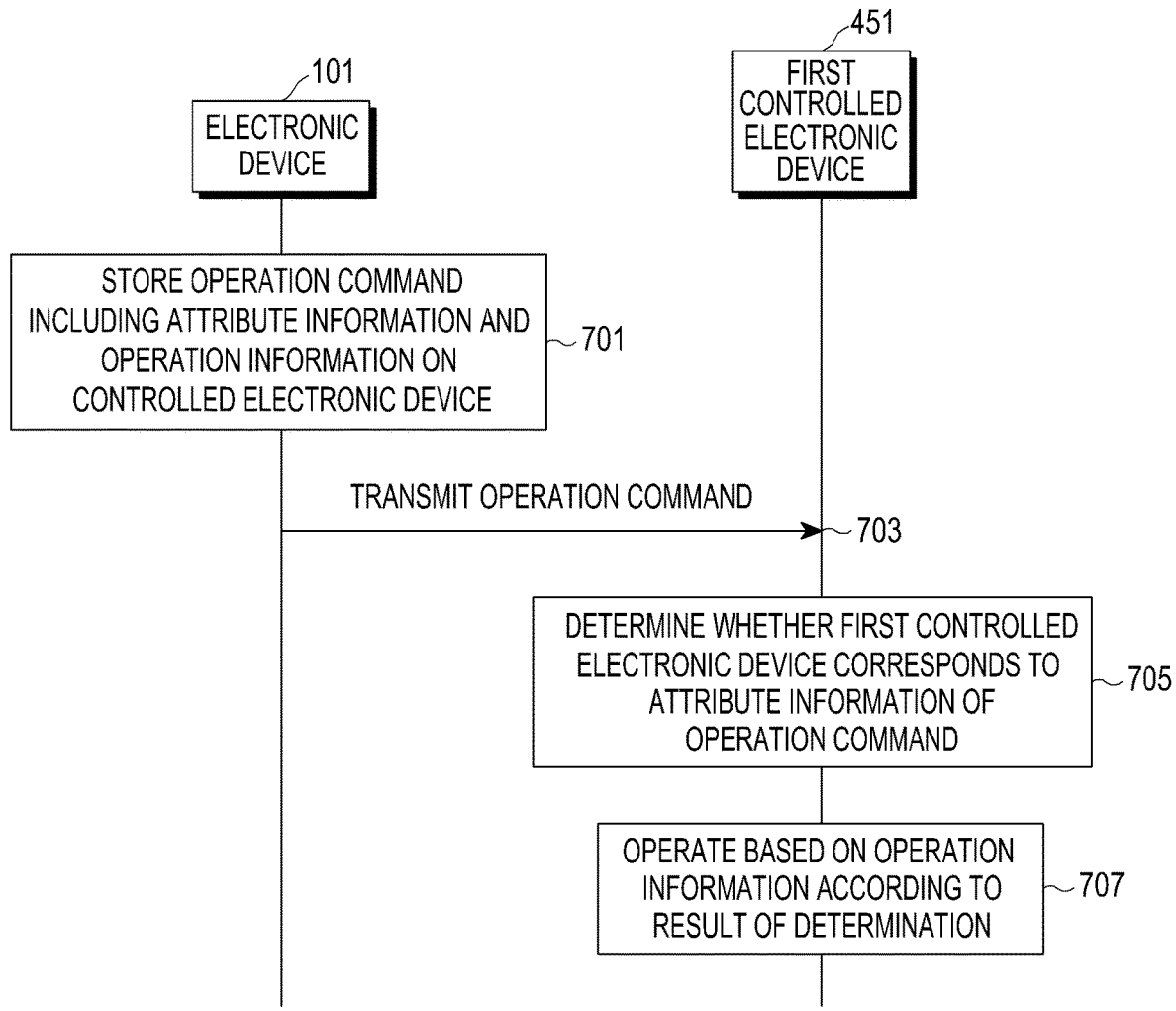
FIG. 7 is a flowchart illustrating a method for communicating operation commands without relaying by a gateway according to an exemplary embodiment.
Figure 8:
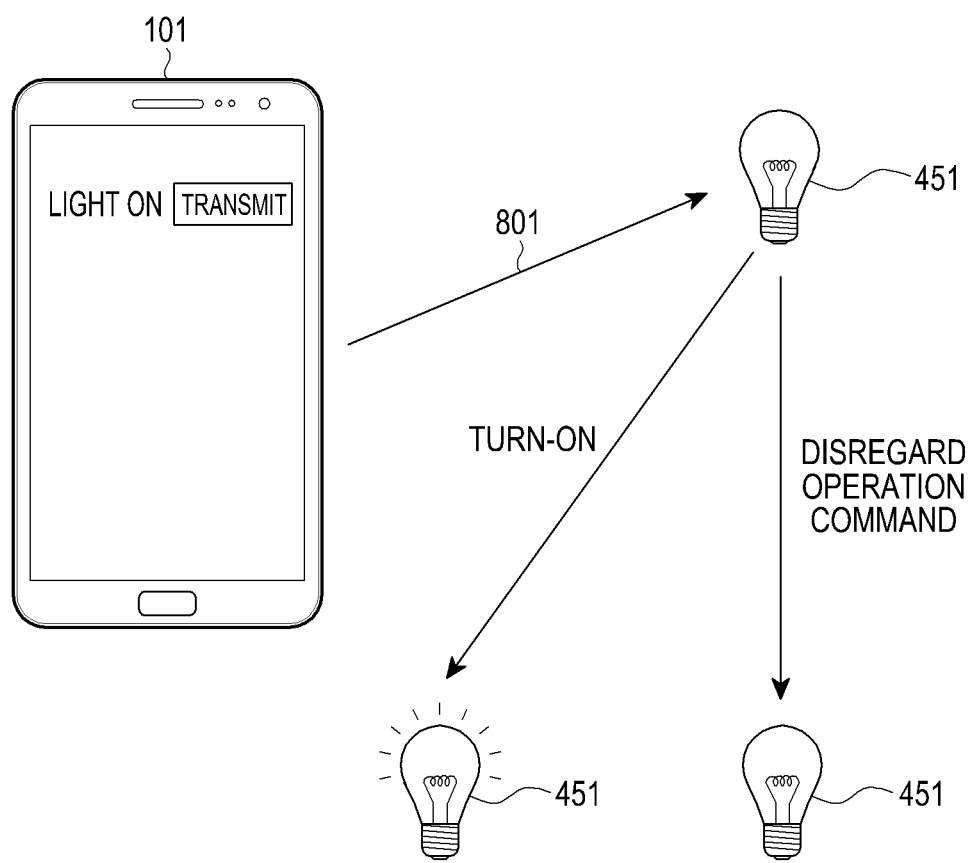
FIG. 8 is a concept view illustrating an operation of a controlled electronic device according to an operation command according to an exemplary embodiment.

FIG. 7 is a flowchart illustrating a method for communicating operation commands without relaying by a gateway according to an exemplary embodiment. FIG. 8 is a concept view illustrating an operation of a controlled electronic device according to an operation command according to an exemplary embodiment.

In operation 701, the electronic device 101 may store an operation command including attribute information and operation information on a controlled electronic device. As described above, the electronic device 101 may generate and store the operation command based on a user input or may receive the operation command from another electronic device. For example, the electronic device 101 may store an operation command including the attribute information on the 'lighting device' and the operation information of 'turn on.'

In operation 703, the electronic device 101 may transmit an operation command 801 as shown in FIG. 8. The electronic device 101 may transmit the stored operation command 801, corresponding to an input of an operation command from the user.

In the exemplary embodiments shown in FIGS. 7 and 8, the electronic device 101 may broadcast the operation command 801.

In operation 705, the first controlled electronic device 451 may determine whether the first controlled electronic device 451 is the controlled electronic device corresponding to the attribute information in the operation command received by the first controlled electronic device 451. Specifically, the first controlled electronic device 451 may compare its attribute information previously stored with the attribute information included in the operation command. When the attribute information in the operation command is consistent with the attribute information stored in the first controlled electronic device 451, the first controlled electronic device 451 may determine that the first controlled electronic device 451 is the controlled electronic device corresponding to the attribute information in the received operation command. According to an exemplary embodiment, even when the attribute information in the operation command is not consistent with the attribute information stored in the first controlled electronic device 451, if it is determined based on a pre-stored similarity determination algorithm that the attribute information in the operation command corresponds to the attribute information stored in the first controlled electronic device 451, the first controlled electronic device 451 may determine that the first controlled electronic device 451 is the controlled electronic device corresponding to the attribute information in the received operation command.

In operation 707, the first controlled electronic device 451 may operate based on the operation information according to a result of the determination. When determining that the first controlled electronic device 451 is the controlled electronic device corresponding to the attribute information in the received operation command, the first controlled electronic device 451 may operate based on the operation information in the operation command. For example, as shown in FIG. 8, the first controlled electronic device 451 may perform a turn-on operation. When determining that the first controlled electronic device 451 is not the controlled electronic device corresponding to the attribute information in the received operation command, the first controlled electronic device 451 may disregard the operation command.

Figure 9:
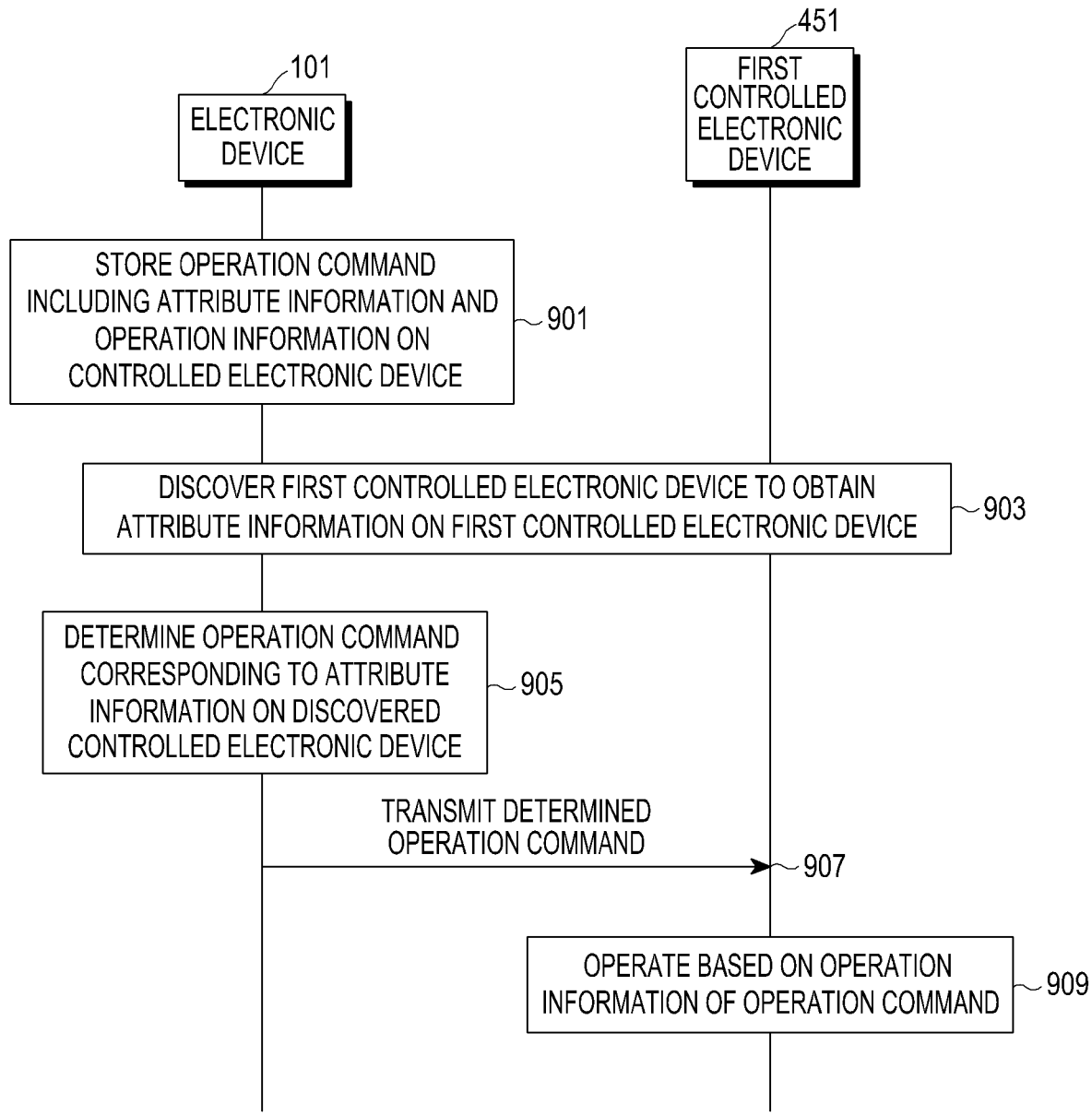
FIG. 9 is a flowchart illustrating a method for communicating operation commands without relaying by a gateway according to an exemplary embodiment.
Figure 10A:
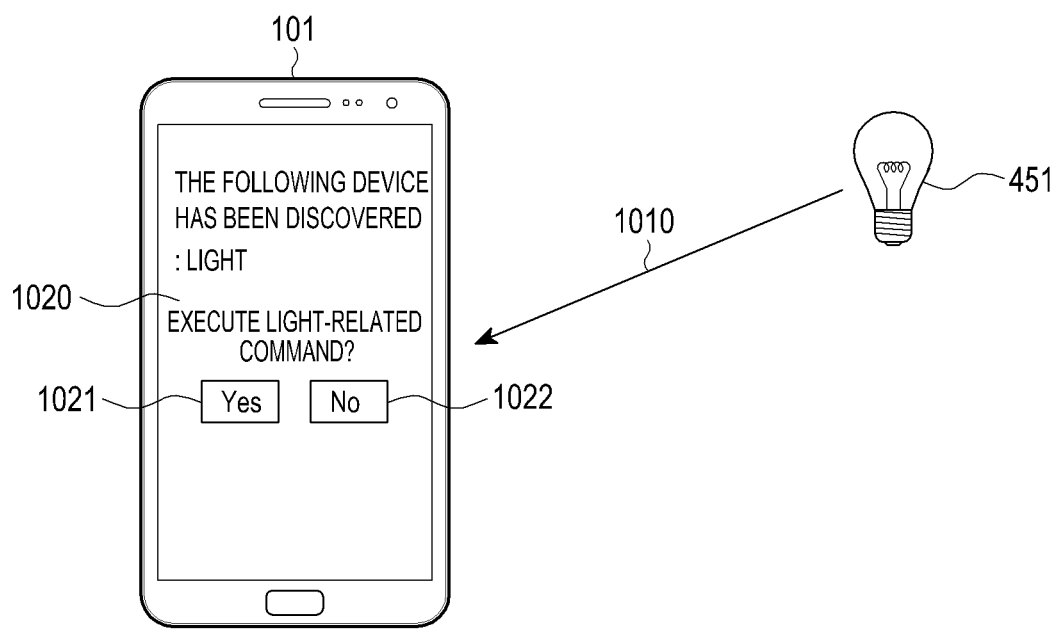
FIGS. 10A and 10B are concept views illustrating an operation of a controlled electronic device according to an operation command according to an exemplary embodiment.
Figure 10B:
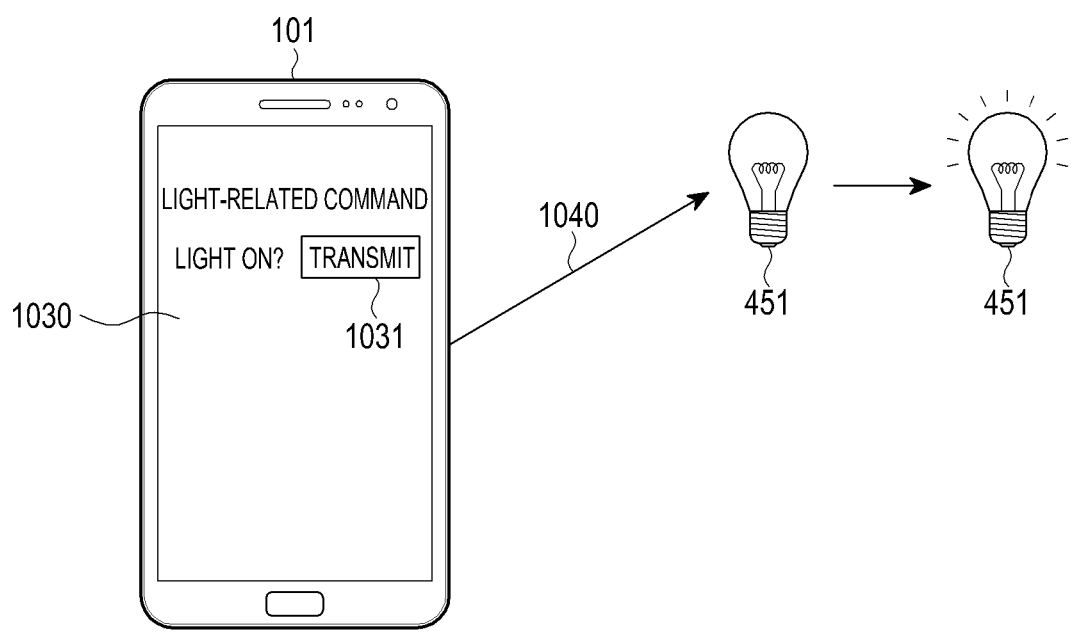

FIG. 9 is a flowchart illustrating a method for communicating operation commands without relaying by a gateway according to an exemplary embodiment. FIGS. 10A and 10B are concept views illustrating an operation of a controlled electronic device according to an operation command according to an exemplary embodiment.

In operation 901, the electronic device 101 may store an operation command including attribute information and operation information on a controlled electronic device. As described above, the electronic device 101 may generate and store the operation command based on a user input or may receive the operation command from another electronic device. For example, the electronic device 101 may store an operation command including the attribute information on the 'lighting device' and the operation information of 'turn on.' Further, the electronic device 101 may further store the operation command including the attribute information on the 'room heating/cooling device' and the operation information of 'adjust temperature to 24° C.'

In operation 903, the electronic device 101 may discover controlled electronic devices in the network and may obtain attribute information on the controlled electronic devices. For example, as shown in FIG. 10, the electronic device 101 may discover all of the controlled electronic devices in the network and may obtain attribute information 1010 on the controlled electronic devices. Also, the electronic device 101 may discover a controlled electronic device within a communicable distance and may obtain attribute information on the discovered controlled electronic device. In other words, according to an exemplary embodiment, a controlled electronic device may not enroll in a particular network, and the electronic device 101 may discover a controlled electronic device within a communicable distance to obtain attribute information thereof. For example, it is assumed in the exemplary embodiment shown in FIG. 10A that the attribute information 1010 transmitted from the first controlled electronic device 451 is 'lighting device.'

In operation 905, the electronic device 101 may determine an operation command corresponding to the attribute information on the discovered controlled electronic device. For example, the electronic device 101 may determine an operation command including attribute information on the 'lighting device' and the operation information of 'turn on' corresponding to the 'lighting device' of the received attribute information 1010.

In operation 907, the electronic device 101 may transmit the determined operation command. According to an exemplary embodiment, the electronic device 101 may display a graphic user interface 1020 to select the determined operation command as shown in FIG. 10A. According to an exemplary embodiment, the graphic user interface 1020 may include the content of the determined operation command and icons 1021 and 1222 to enable selection of whether to execute the determined operation command. The electronic device 101 may display a graphic user interface 1030 for transmitting a specific operation command as shown in FIG. 10B, in response to selection of the icon 1021. According to an exemplary embodiment, the graphic user interface 1030 may include the operation information included in the determined operation command and an icon 1031 to enable selection of whether to execute the specific operation command. The electronic device 101 may transmit an operation command 1040 as shown in FIG. 10B, in response to selection of the icon 1031. The operation command 1040 may include the attribute information on the 'lighting device' and the operation information of 'turn on.'

In operation 909, the first controlled electronic device 451 may operate based on the operation information in the operation command. For example, the operation command 1040 may include the operation information of 'turn on' and accordingly the first controlled electronic device 451 may turn on.

Alternatively, on the other hand, the electronic device 101 may transmit only the operation information in the determined operation command to the first controlled electronic device 451. For example, when the operation information corresponding to the first controlled electronic device 451 is determined by the operation command including the attribute information on the 'lighting device' and the operation information of 'turn on', the electronic device 101 may transmit only the operation information of 'turn on' to the first controlled electronic device 451. In this case, the first controlled electronic device 451 may operate based on the received operation information.

Figure 11:
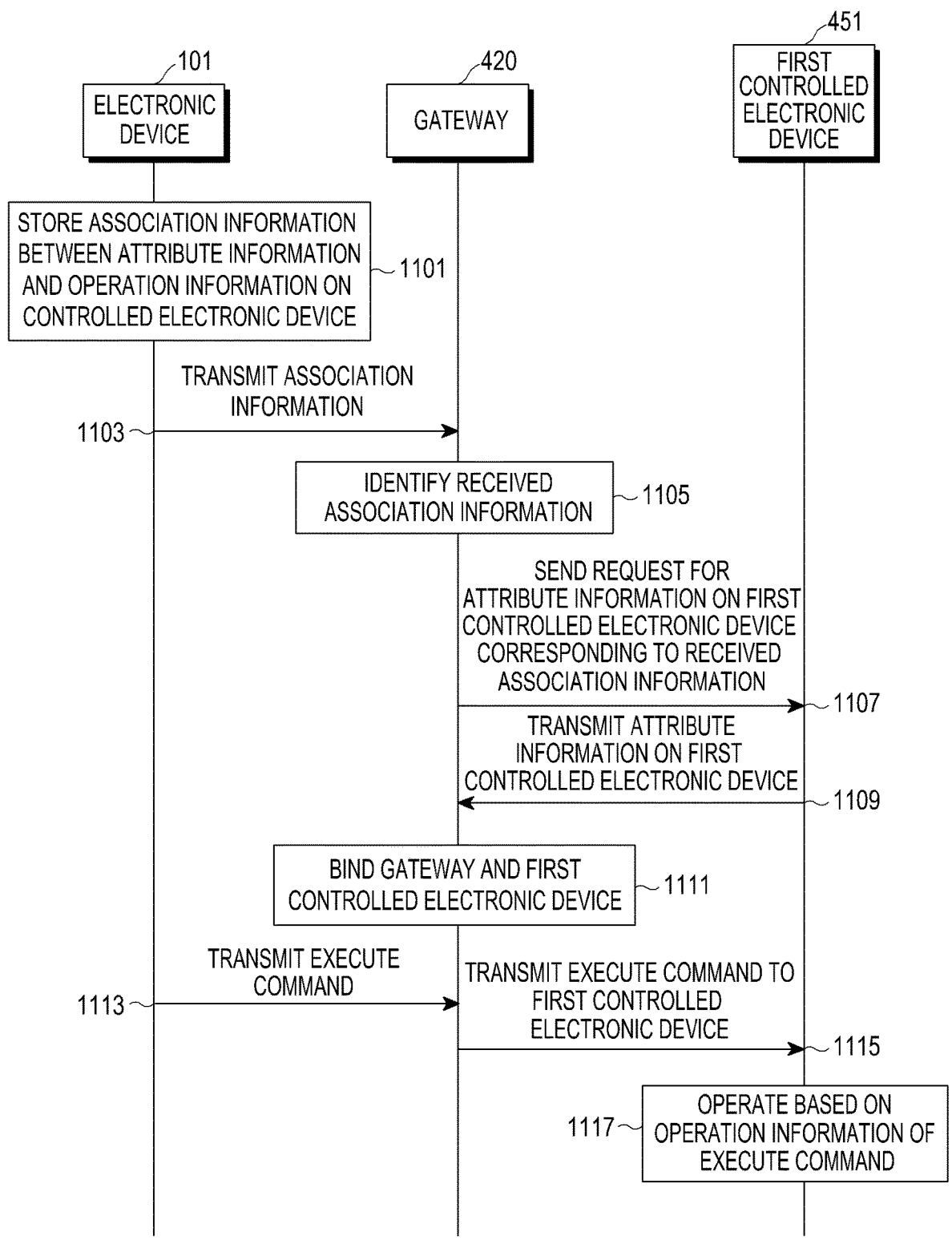
FIG. 11 is a flowchart illustrating a method for controlling an electronic device according to an exemplary embodiment.

FIG. 11 is a flowchart illustrating a method for controlling an electronic device according to an exemplary embodiment.

In operation 1101, the electronic device 101 may store association information between the attribute information and the operation information on the controlled electronic device. The electronic device 101 may generate and store the association information based on a user input or may receive the association information from another electronic device. For example, the electronic device 101 may store association information including the attribute information on the 'lighting device' and the operation information of 'turn on.' Further, the electronic device 101 may further store the association information including the attribute information on the 'room heating/cooling device' and the operation information of 'adjust temperature to 24° C.'

In operation 1103, the electronic device 101 may transmit the association information to the gateway 420. The electronic device 101 may transmit the association information when entering the network managed by the gateway 420 or may transmit the association information to the gateway 420 in the process of enrolling in the network.

In operation 1105, the gateway 420 may identify the received association information. For example, the gateway 420 may identify the attribute information on the 'lighting device' and the operation information of 'turn on' from the received association information.

In operation 1107, the gateway 420 may send a request for attribute information on a controlled electronic device to a controlled electronic device in the network, corresponding to the received association information. In operation 1109, the first controlled electronic device 451 may transmit the attribute information on the controlled electronic device 451.

In operation 1111, the gateway 420 may bind together the gateway 420 and the first controlled electronic device 451. For example, the gateway 420 may bind 'URL,192.168.0.3, 5321/a/light, resource type,core.light' of a first resource and 'URL,192.168.0.5,5321/a/fan, resource type,core.fan' of a second resource. Here, the gateway 420 may bind the controlled electronic device by updating the stored existing resource with access information on the controlled electronic device, i.e., URL,192.168.0.3,5321/a/light and URL, 192.168.0.5,5321/a/fan, or newly adding the same.

The gateway 420 may compare the attribute information on the controlled electronic device received from the first controlled electronic device 451 with the attribute information of the association information received from the electronic device 101 and may perform the binding according to a result of the comparison. The gateway 420 may bind the gateway 420 with the first controlled electronic device 451 having the attribute information corresponding to the attribute information of the association information received from the electronic device 101. According to an exemplary embodiment, the gateway 420 may perform the binding in a manner of updating the association information received from the electronic device 101 with access information (e.g., URL or MAC address) on the first controlled electronic device 451. According to an exemplary embodiment, the gateway 420 or the electronic device 101 may update or delete the association information or operation command.

In operation 1113, the electronic device 101 may transmit an execute command to the gateway 420. For example, the electronic device 101 may transmit the execute command to the gateway 420 corresponding to a command input from the user.

In operation 1115, the gateway 420 may transmit the execute command to the first controlled electronic device 451 that is bound with the gateway 420. In operation 1117, the first controlled electronic device 451 may operate based on the operation information of the execute command. According to an exemplary embodiment, the gateway 420 may transmit only the operation information to the first controlled electronic device 451. In this case, the first controlled electronic device 451 may operate based on the received operation information.

Figure 12:
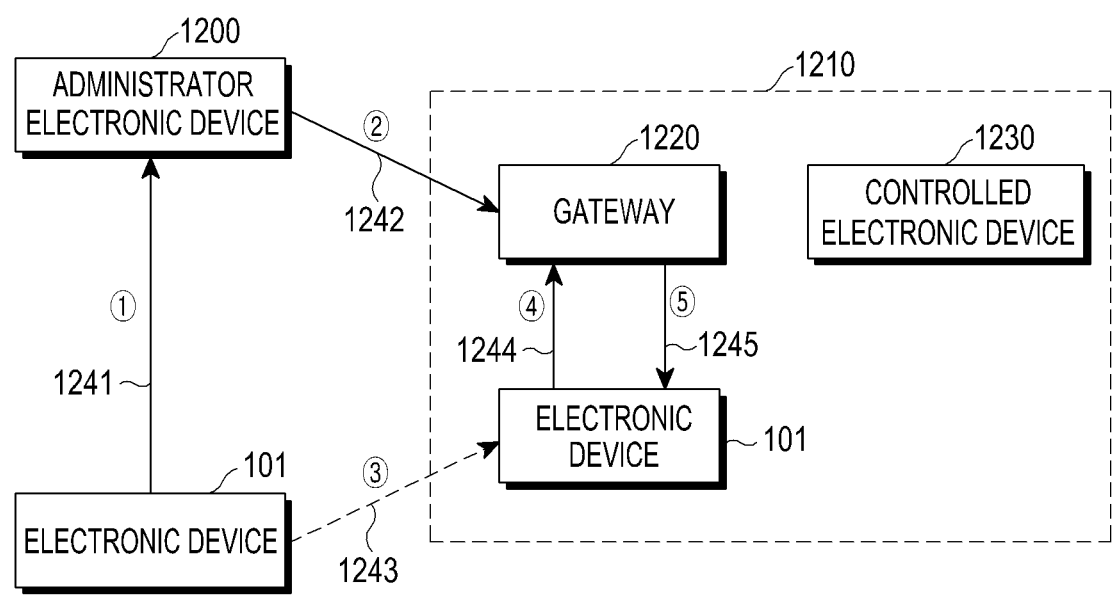
FIG. 12 is a concept view illustrating an authentication process according to an exemplary embodiment.

FIG. 12 is a concept view illustrating an authentication process according to an exemplary embodiment.

The electronic device 101 may send a request for a right to control a controlled electronic device to an administrator electronic device 1200 (operation 1241). The administrator electronic device 1200 may be a device that may manage a right to control a controlled electronic device 1230 in a network 1210. The administrator electronic device 1200 may transmit identification information on the electronic device 101 which is approved to control the controlled electronic device to a gateway 1220 (operation 1242).

The electronic device 101 may enter the network 1210 (operation 1243). The electronic device 101 may transmit its identification information to the gateway 1220 while entering the network 1210 (operation 1244). The gateway 1220 may determine whether the identification information on the electronic device 101 is identification information identified by the administrator electronic device 1200. When the identification information matches, the gateway 1220 may provide approval of the control right to the electronic device 101 (operation 1245). The electronic device 101 receiving the approval of the control right may control the controlled electronic device 1230 to operate by using an operation command.

Figure 13:
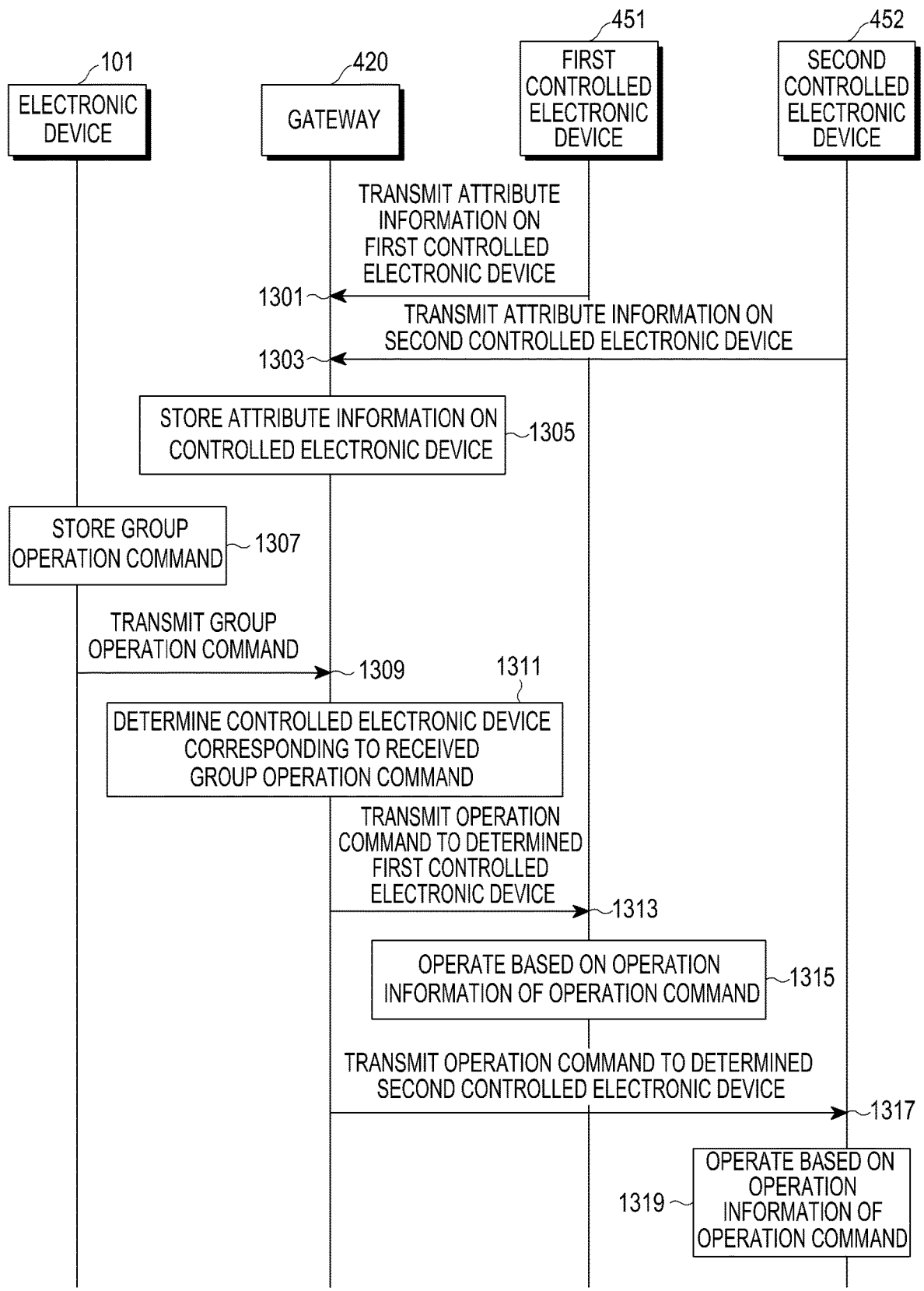
FIG. 13 is a flowchart illustrating an example of executing a group operation command according to an exemplary embodiment.

FIG. 13 is a flowchart illustrating an example of executing a group operation command according to an exemplary embodiment.

In operation 1301, the first controlled electronic device 451 may send attribute information on the first controlled electronic device 451 to the gateway 420. In operation 1303, the second controlled electronic device 452 may send attribute information on the second controlled electronic device 452 to the gateway 420. As described above, the first electronic device 451 and the second controlled electronic device 452, each, may receive and store the attribute information at the time of the manufacture or may determine and store the attribute information on the electronic device through an application that is run after the time of manufacture. The first and second controlled electronic devices 451 and 452 may determine and store the attribute information based on a user input. The first and second controlled electronic devices 451 and 452 may transmit the attribute information to the gateway 420 while enrolling in a network managed by the gateway 420. The communication of the attribute information may be included in the process of enrolling in the network managed by the gateway 420. Or, the gateway 420 may send a request for the attribute information to the first and second controlled electronic devices 451 and 452, and the first and second controlled electronic devices 451 and 452 may transmit the attribute information in response to the request.

In operation 1305, the gateway 420 may store attribute information on controlled electronic devices in the network. The gateway 420 may store the attribute information on the controlled electronic devices received in operations 1301 and 1303 in the form of a lookup table or database, e.g., as in Table 3 described above.

In operation 1307, the electronic device 101 may store a group operation command including attribute information and operation information on each of at least one controlled electronic device. The electronic device 101 may generate and store the group operation command based on a user input or may receive the group operation command from another electronic device. For example, the electronic device 101 may store a group operation command including the attribute information on the 'lighting device' and the operation information of 'turn on' and the attribute information on the 'room heating/cooling device' and the operation information of 'adjust temperature to 24° C.'

In operation 1309, the electronic device 101 may transmit the group operation command to the gateway 420. The electronic device 101 may transmit the group operation command when entering the network managed by the gateway 420 or may transmit the group operation command to the gateway 420 in the process of enrolling in the network. Or, the electronic device 101 may transmit the operation command in response to an input of a group operation command from the user after enrolling in the network.

In operation 1311, the electronic device 101 may determine a controlled electronic device corresponding to the received group operation command. For example, when receiving the group operation command including the attribute information on the 'lighting device' and the operation information of 'turn on' and the attribute information on the 'room heating/cooling device' and the operation information of 'adjust temperature to 24° C.', the electronic device 101 may determine the first controlled electronic device 451 having the attribute information corresponding to the 'lighting device' that is the attribute information in the group operation command. Further, the electronic device 101 may determine the second controlled electronic device 452 having the attribute information corresponding to the attribute information on the 'room heating/cooling device.'

In operation 1313, the gateway 420 may transmit the group operation command to the determined first controlled electronic device 451. According to an exemplary embodiment, the gateway 420 may transmit only the operation information in the group operation command to the determined first controlled electronic device 451. In operation 1315, the first controlled electronic device 451 may operate based on the operation information in the group operation command. When receiving only the operation information, the first controlled electronic device 451 may operate based on the operation information. For example, the first controlled electronic device 451 may turn on based on the operation information of 'turn on' corresponding to the 'lighting device' that is its attribute information in the group operation command.

In operation 1317, the gateway 420 may transmit the group operation command to the determined second controlled electronic device 452. According to an exemplary embodiment, the gateway 420 may transmit only the operation information in the group operation command to the determined second controlled electronic device 452. In operation 1319, the second controlled electronic device 452 may operate based on the operation information in the group operation command. When receiving only the operation information, the second controlled electronic device 452 may operate based on the operation information. For example, the second controlled electronic device 452 may be driven based on the operation information of 'adjust temperature to 24° C.' corresponding to the 'room heating/cooling device' that is its attribute information in the group operation command.

Figure 14A:
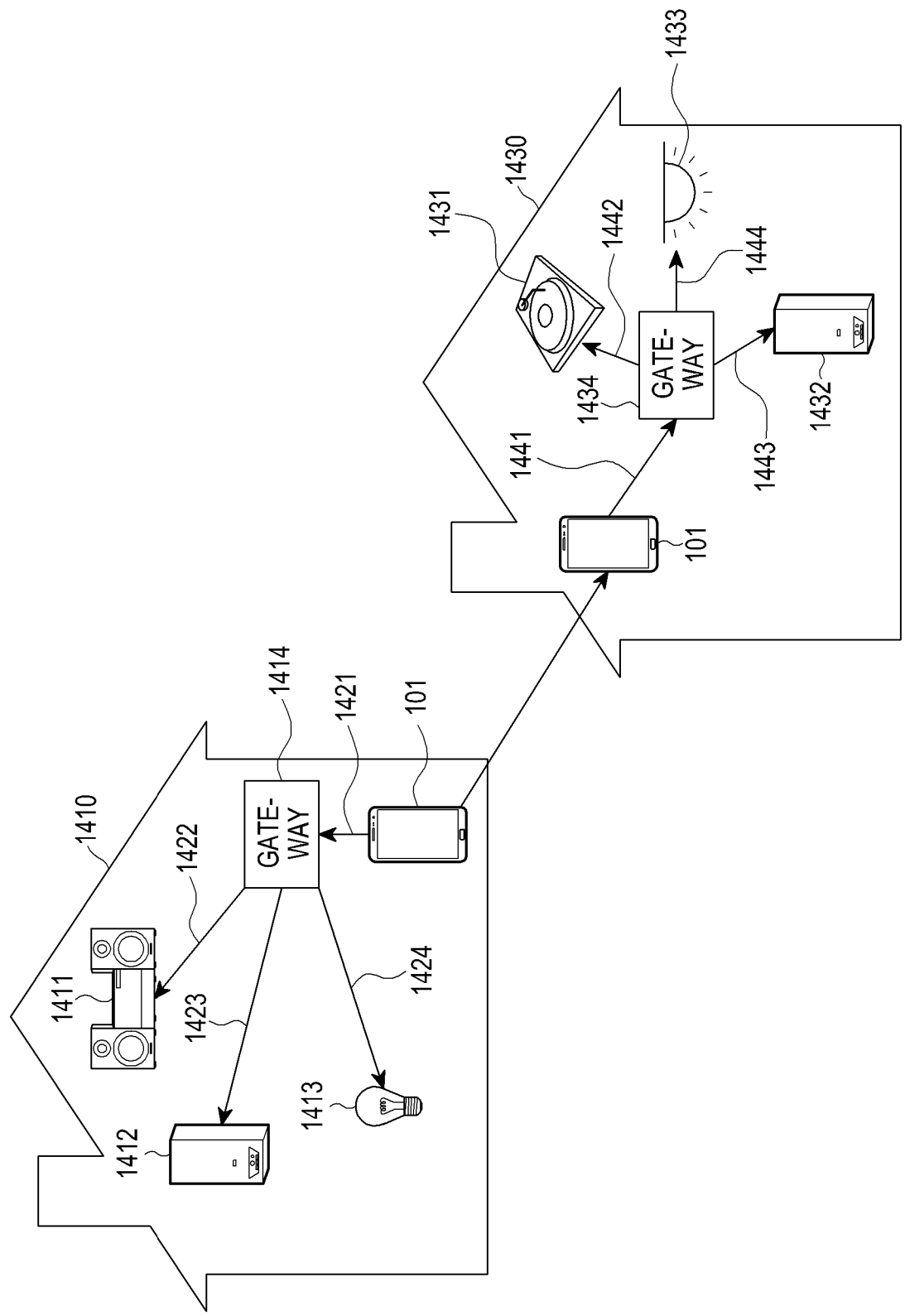
FIGS. 14A and 14B are concept views illustrating an example of executing a group operation command according to exemplary embodiments.
Figure 14B:
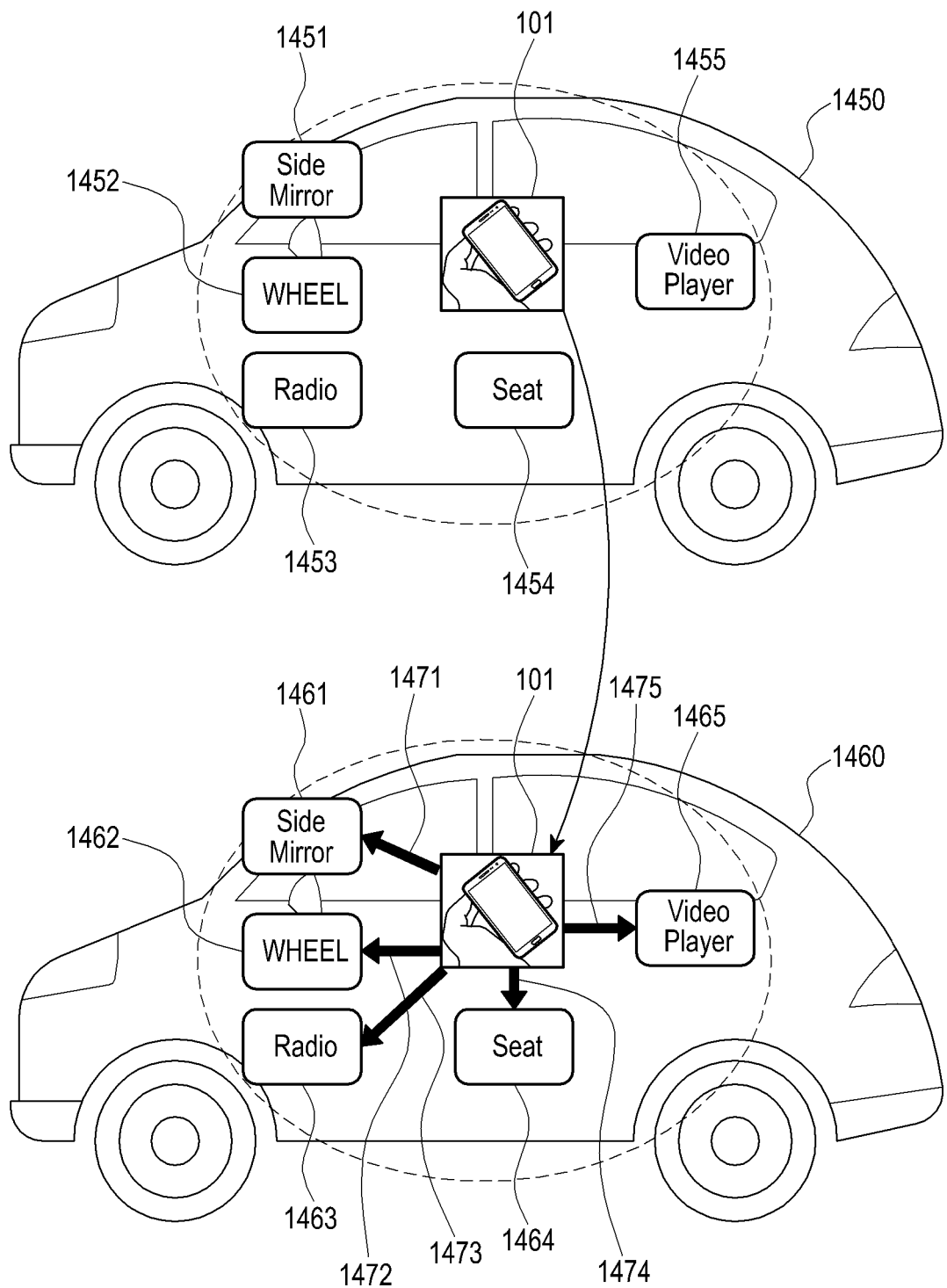

FIGS. 14A and 14B are concept views illustrating an example of performing a group operation command according to exemplary embodiments.

Referring to FIG. 14A, a first network 1410 may include at least one controlled electronic device 1411 to 1413 and a gateway 1414. The gateway 1414 may manage enrollment or disenrollment of electronic devices in the first network 1410 and may control the electronic devices in the network. The electronic device 101 may transmit a group operation command 1421 to the gateway 1414 in the first network 1410. The gateway 1414 may transmit the received group operation command 1421 to the controlled electronic devices 1411 to 1413 corresponding to the group operation command 1421. For example, in the exemplary embodiment shown in FIG. 14A, the group operation command 1421 may be shown in Table 4.

TABLE 4

| Attribute information | Operation information |
|---|---|
| Lighting device | Turn on |
| Room heating/cooling device | adjust temperature to 24° C. |
| Media device | Play upbeat music |

Corresponding to the received group operation command 1421, the gateway 1414 may transmit a group operation command 1422 to the first controlled electronic device 1411 having the attribute of the 'media device', a group operation command 1423 to the second controlled electronic device 1412 having the attribute of the 'room heating/cooling device', and a group operation command 1424 to the third controlled electronic device 1423 having the attribute of the 'lighting device.' The first controlled electronic device 1411 receiving the group operation command 1422 may operate according to the operation information of 'play upbeat music', the second controlled electronic device 1412 receiving the group operation command 1423 may operate according to the operation information of 'adjust temperature to 24° C.', and the third controlled electronic device 1413 receiving the group operation command 1424 may operate according to the operation information of 'turn on.'

The electronic device 101 may generate and store the group operation command to correspond to the controlled electronic devices 1411 to 1413 in the first network 1410. The electronic device 101 may enter a second network 1430. The electronic device 101 may transmit the stored group operation command 1441 to a gateway 1434 in the second network 1430. Corresponding to the received left eye image 1441, the gateway 1434 may transmit a group operation command 1442 to a fourth controlled electronic device 1431 having the attribute of the 'media device', a group operation command 1443 to a fifth controlled electronic device 1432 having the attribute of the 'room heating/cooling device', and a group operation command 1444 to a sixth controlled electronic device 1443 having the attribute of the 'lighting device.' The fourth controlled electronic device 1431 receiving the group operation command 1442 may operate according to the operation information of 'play upbeat music', the fifth controlled electronic device 1432 receiving the group operation command 1443 may operate according to the operation information of 'adjust temperature to 24° C.', and the sixth controlled electronic device 1433 receiving the group operation command 1444 may operate according to the operation information of 'turn on.'

Accordingly, the electronic device 101 may control the controlled electronic devices in the network so that the same group operation command is performed regardless of the first network 1410 and the second network 1430. In particular, even when the third controlled electronic device 1413 and the sixth controlled electronic device 1433 are of different models or produced by different manufacturers, if the two controlled electronic devices have the same attribute, the two electronic devices may be operated in the same manner by the group operation command. Thus, a group operation command may be defined and executed independently from a network which may be different for each group operation that operates while being tightly coupled with a particular network.

Referring to FIG. 14B, the electronic device 101 may define a group operation command in a first automobile system 1450. The first automobile system 1450 may include a plurality of electronic devices, e.g., a side mirror 1451, a wheel 1452, a radio 1453, a seat 1454, and a video player 1455. The electronic device 101 may define settings for each of the plurality of electronic devices 1451 to 1455 in the first automobile system 1450 by using a group operation command. For example, the group operation command for the first automobile system 1450 may be shown in Table 5.

TABLE 5

| Attribute information | Operation information |
|---|---|
| Side mirror | Remote view secure mode |
| Wheel | Adjust height to be 10 cm or less lower than breast<br>Sport mode |
| Radio | Favored channel, 82.1 MHz |
| Seat | Position that is 50 cm away from reference point |
| Video player | Favored URL for access http://moviewatch.co.kr |

According to an exemplary embodiment, the user may directly input settings for each of the side mirror 1451, wheel 1452, radio 1453, seat 1454, and video player 1455 to the first automobile system 1450. The first automobile system 1450 may send the directly inputted settings for each electronic device to the electronic device 101, and the electronic device 101 may generate and store a group operation command based on the received electronic device settings. Or, the user may directly input a group operation command to the electronic device 101, and the electronic device 101 may store the inputted group operation command.

The first automobile system 1450 may receive the group operation command from the electronic device 101. The first automobile system 1450 may control the side mirror 1451, the wheel 1452, the radio 1453, the seat 1454, and the video player 1455 based on the received group operation command.

The user may move to another car in which a second automobile system 1460 is provided. The user may perform control so that the second automobile system 1460 transmits the group operation command by manipulating the electronic device 101. The second automobile system 1460 may transmit group operation commands 1471 to 1475 to the side mirror 1461, the wheel 1462, the radio 1463, the seat 1464, and the video player 1465, respectively, based on the group operation command received from the electronic device 101. The side mirror 1461, the wheel 1462, the radio 1463, the seat 1464, and the video player 1465, respectively, may operate based on the group operation commands 1471 to 1475. Accordingly, the user may use the same electronic device settings as those of the first automobile system 1450.

Figure 15:
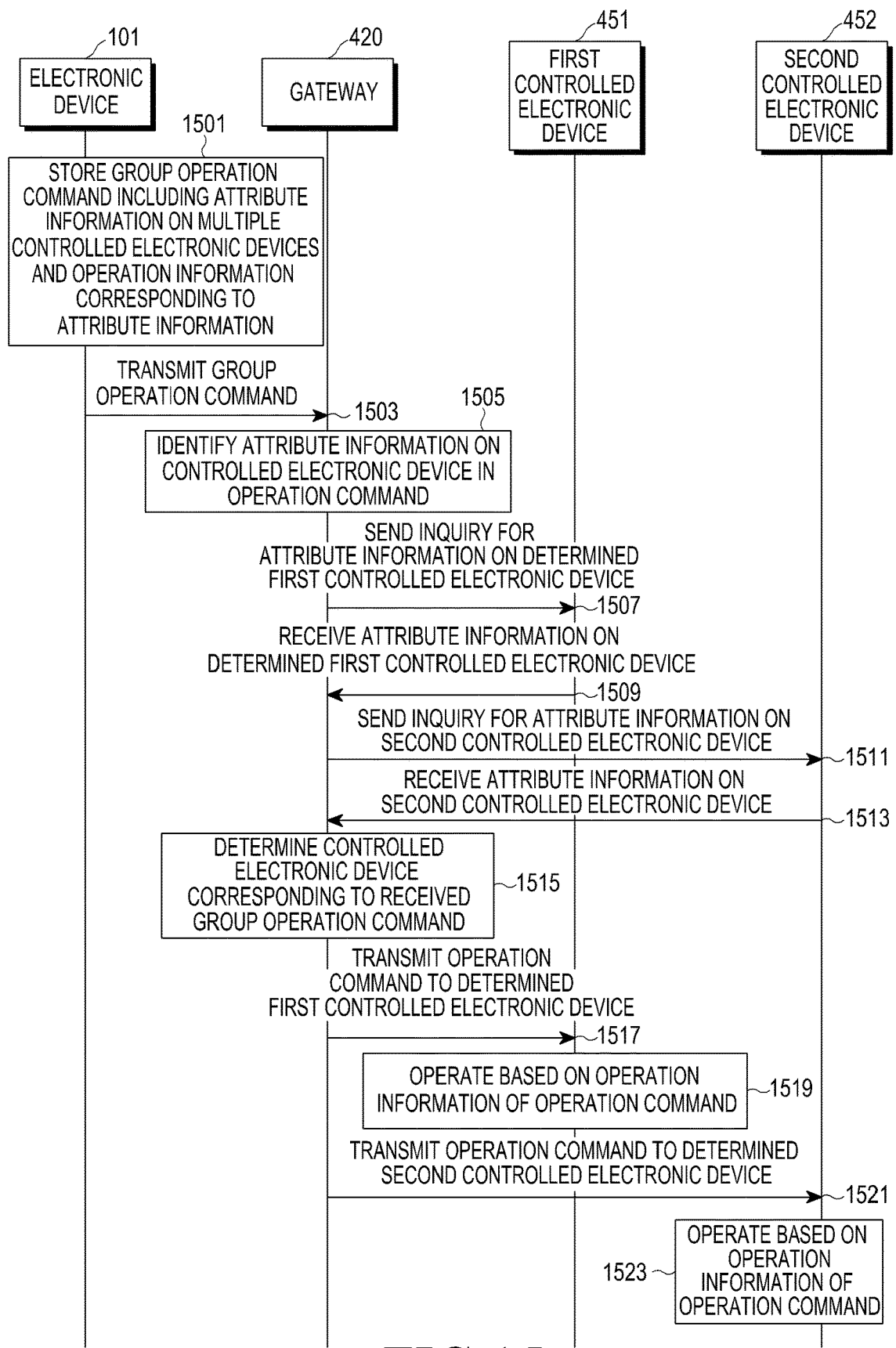
FIG. 15 is a concept view illustrating an example of communicating group operation commands according to an exemplary embodiment.

FIG. 15 is a concept view illustrating an example of communicating group operation commands according to an exemplary embodiment.

In operation 1501, the electronic device 101 may store a group operation command including attribute information and operation information on a controlled electronic device. As described above, the electronic device 101 may generate and store the group operation command based on a user input or may receive the group operation command from another electronic device. For example, the electronic device 101 may store a group operation command including the attribute information on the 'lighting device' and the operation information of 'turn on' and the attribute information on the 'room heating/cooling device' and the operation information of 'adjust temperature to 24° C.'

In operation 1503, the electronic device 101 may transmit the group operation command to the gateway 420. The electronic device 101 may transmit the group operation command when entering the network managed by the gateway 420 or may transmit the group operation command to the gateway 420 in the process of enrolling in the network. Or, the electronic device 101 may transmit the operation command in response to an input of a group operation command from the user after enrolling in the network.

In operation 1505, the gateway 420 may identify the attribute information on the controlled electronic device in the group operation command. For example, the gateway 420 may identify that the attribute information in the group operation command is the 'lighting device' and the 'room heating/cooling device.'

In operations 1507 and 1511, the gateway 420 may send an inquiry for attribute information to all of the controlled electronic devices (e.g., the first controlled electronic device 451 and the second controlled electronic device 453) in the network. In operations 1509 and 1513, the gateway 420 may receive the attribute information from the first and second controlled electronic devices 451 and 452 in the network.

In operation 1515, the gateway 420 may determine a controlled electronic device corresponding to the received group operation command from among all of the controlled electronic devices in the network. For example, the gateway 420 may receive the attribute information on the 'lighting device' from the 451 and the attribute information on the 'room heating/cooling device' from the second controlled electronic device 452. The gateway 420 may determine the controlled electronic devices corresponding to the attribute information on the 'lighting device' and the 'room heating/cooling device' in the group operation command as the controlled electronic devices 451 and 452.

In operations 1517 and 1521, the gateway 420 may transmit a group operation command to each of the determined controlled electronic devices 451 and 452. In operation 1519, the first controlled electronic device 451 may operate based on the operation information in the received group operation command. For example, the first controlled electronic device 451 may turn on based on the 'turn on' operation information in the operation command. In operation 1523, the second controlled electronic device 452 may operate based on the operation information in the received group operation command. For example, the second controlled electronic device 452 may turn on and adjust temperature based on the 'adjust temperature to 24° C.' operation information in the operation command.

Figure 16A:
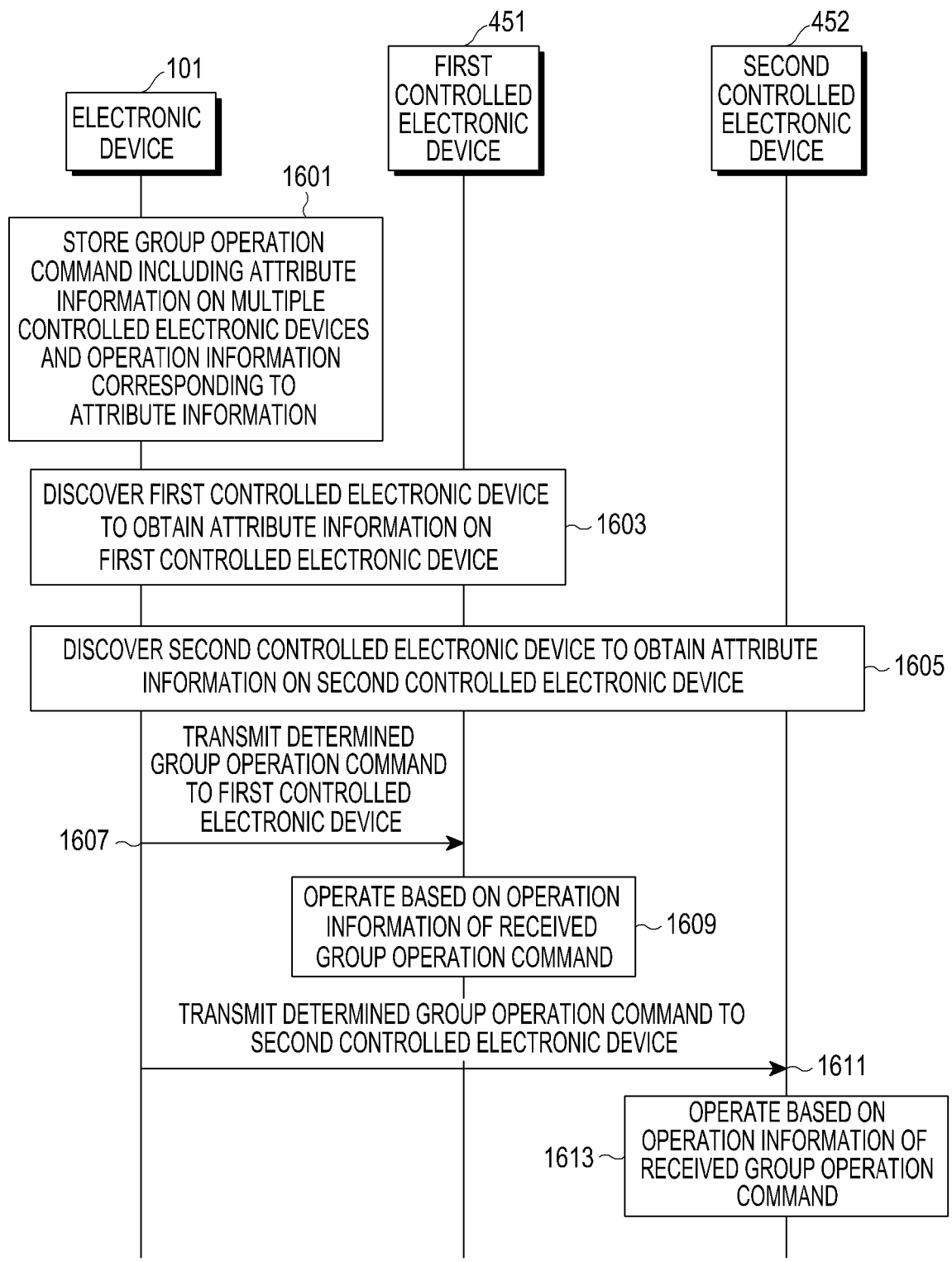
FIGS. 16A and 16B are concept views illustrating an example of communicating group operation commands according to an exemplary embodiment.
Figure 16B:
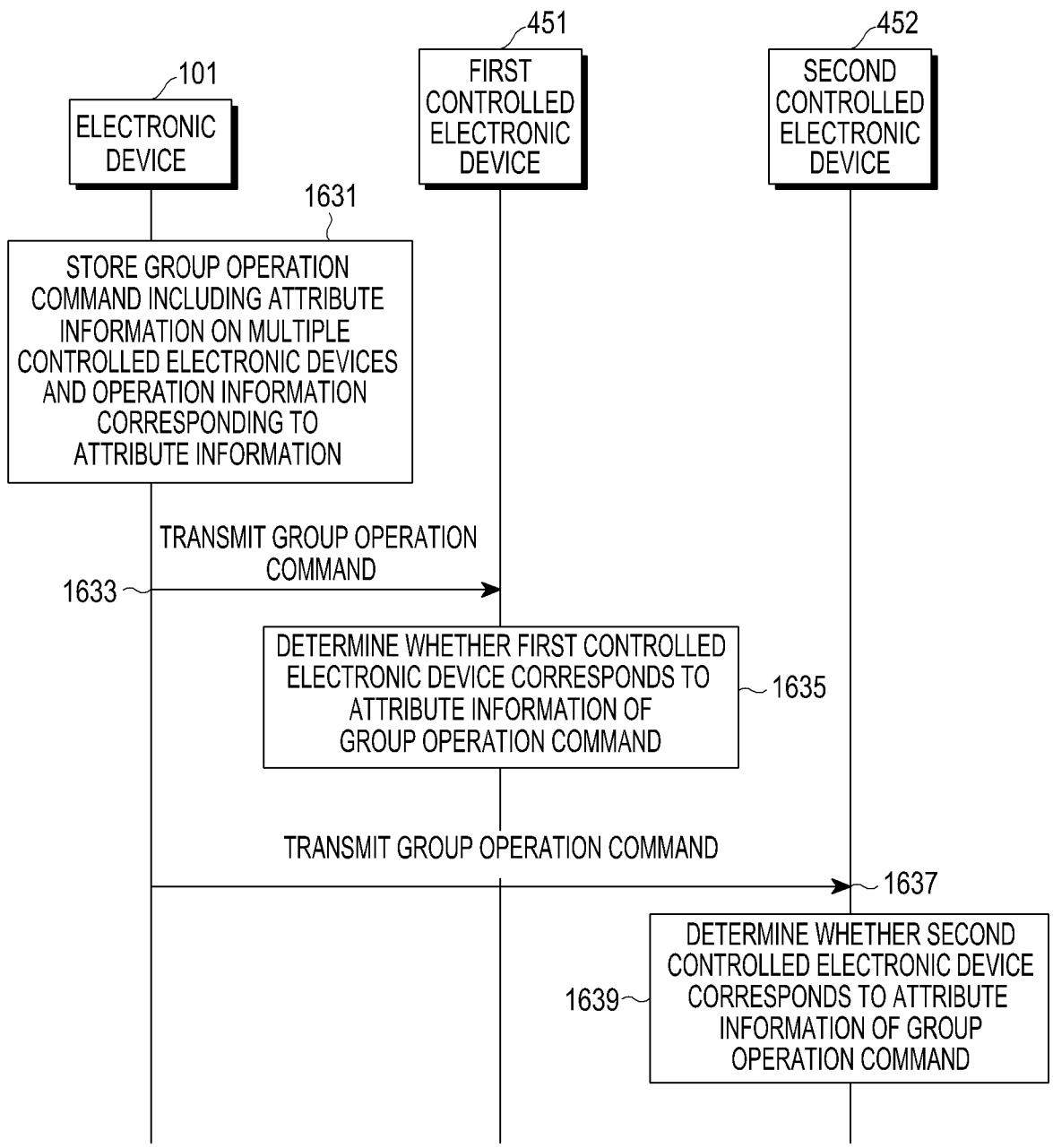

FIGS. 16A and 16B are concept views illustrating an example of communicating group operation commands according to an exemplary embodiment.

In operation 1601, the electronic device 101 may store a group operation command including attribute information on a controlled electronic device and corresponding operation information. As described above, the electronic device 101 may generate and store the group operation command based on a user input or may receive the group operation command from another electronic device. For example, the electronic device 101 may store a group operation command including the attribute information on the 'lighting device' and the operation information of 'turn on' and the attribute information on the 'room heating/cooling device' and the operation information of 'adjust temperature to 24° C.'

In operation 1603, the electronic device 101 may discover the first controlled electronic device 451 in the network to obtain the attribute information on the controlled electronic device. In operation 1605, the electronic device 101 may discover the second controlled electronic device 452 in the network to obtain the attribute information on the controlled electronic device 452. In an exemplary embodiment, the electronic device 101 may discover a controlled electronic device within a communicable distance and may obtain attribute information on the electronic device. In other words, according to an exemplary embodiment, a controlled electronic device may not enroll in a particular network, and the electronic device 101 may discover a controlled electronic device within a communicable distance to obtain attribute information. For example, it is assumed that the attribute information transmitted from the first controlled electronic device 451 is the 'lighting device', and the attribute information transmitted from the second controlled electronic device 452 is the 'room heating/cooling device.'

In operations 1607 and 1611, the electronic device 101 may determine and transmit a group operation command corresponding to the attribute information on the discovered controlled electronic device. For example, the electronic device 101 may determine a group operation command including the attribute information on the 'lighting device' and the operation information of 'turn on' and the attribute information on the 'room heating/cooling device' and the operation information of 'adjust temperature to 24° C.', corresponding to the 'lighting device' and 'room heating/cooling device' that are the received attribute information. The electronic device 101 may transmit the determined group operation command. According to an exemplary embodiment, the electronic device 101 may display a graphic user interface for selecting the determined group operation command to obtain a group operation command transmit command.

In operation 1609, the first controlled electronic device 451 may operate based on the operation information of the group operation command. For example, the first controlled electronic device 451 may turn on corresponding to the 'turn on' operation information of the group operation command. In operation 1613, the second controlled electronic device 452 may operate based on the operation information in the group operation command. For example, the first controlled electronic device 451 may turn on and adjust temperature corresponding to the 'adjust temperature to 24° C.' operation information of the group operation command.

Alternatively, on the other hand, the electronic device 101 may transmit only the operation information in the determined group operation command to the controlled electronic devices 451 and 452. In this case, the controlled electronic devices 451 and 452, each, may operate based on the received operation information.

FIG. 16B is a flowchart illustrating a method for communicating group operation commands without relaying by a gateway according to an exemplary embodiment.

In operation 1631, the electronic device 101 may store a group operation command including attribute information on a controlled electronic device and corresponding operation information. As described above, the electronic device 101 may generate and store the group operation command based on a user input or may receive the group operation command from another electronic device. For example, the electronic device 101 may store a group operation command including the attribute information on the 'lighting device' and the operation information of 'turn on' and the attribute information on the 'room heating/cooling device' and the operation information of 'adjust temperature to 24° C.'

In operations 1633 and 1637, the electronic device 101 may transmit the group operation command. The electronic device 101 may transmit the stored group operation command corresponding to a group operation command input from the user. The electronic device 101 may broadcast a group operation command 801.

In operations 1635 and 1639, the controlled electronic devices 451 and 452, each, may determine whether the controlled electronic devices 451 and 452 are the controlled electronic device corresponding to the attribute information of the received group operation command. Specifically, the controlled electronic devices 451 and 452 may compare their attribute information that is previously stored with the attribute information included in the operation command. When the attribute information in the group operation command is consistent with the attribute information stored in the controlled electronic devices 451 and 452, the controlled electronic devices 451 and 452 may determine that the controlled electronic devices 451 and 452 are the controlled electronic devices corresponding to the attribute information in the received group operation command. According to an exemplary embodiment, even when the attribute information in the group operation command is not consistent with the attribute information stored in the controlled electronic devices 451 and 452, if it is determined based on a pre-stored similarity determination algorithm that the attribute information in the group operation command corresponds to the attribute information stored in the controlled electronic devices 451 and 452, the controlled electronic devices 451 and 452 may determine that the controlled electronic devices 451 and 452 are the controlled electronic devices corresponding to the attribute information in the received group operation command. The controlled electronic devices 451 and 452 may operate based on the operation information according to a result of the determination. When determining that the controlled electronic devices 451 and 452 are the controlled electronic devices corresponding to the attribute information in the received group operation command, the controlled electronic devices 451 and 452 may operate based on the operation information corresponding to their attribute information in the group operation command. When determining that the controlled electronic devices 451 and 452 are not the controlled electronic devices corresponding to the attribute information in the received group operation command, the controlled electronic devices 451 and 452 may disregard the group operation command.

Figure 17:
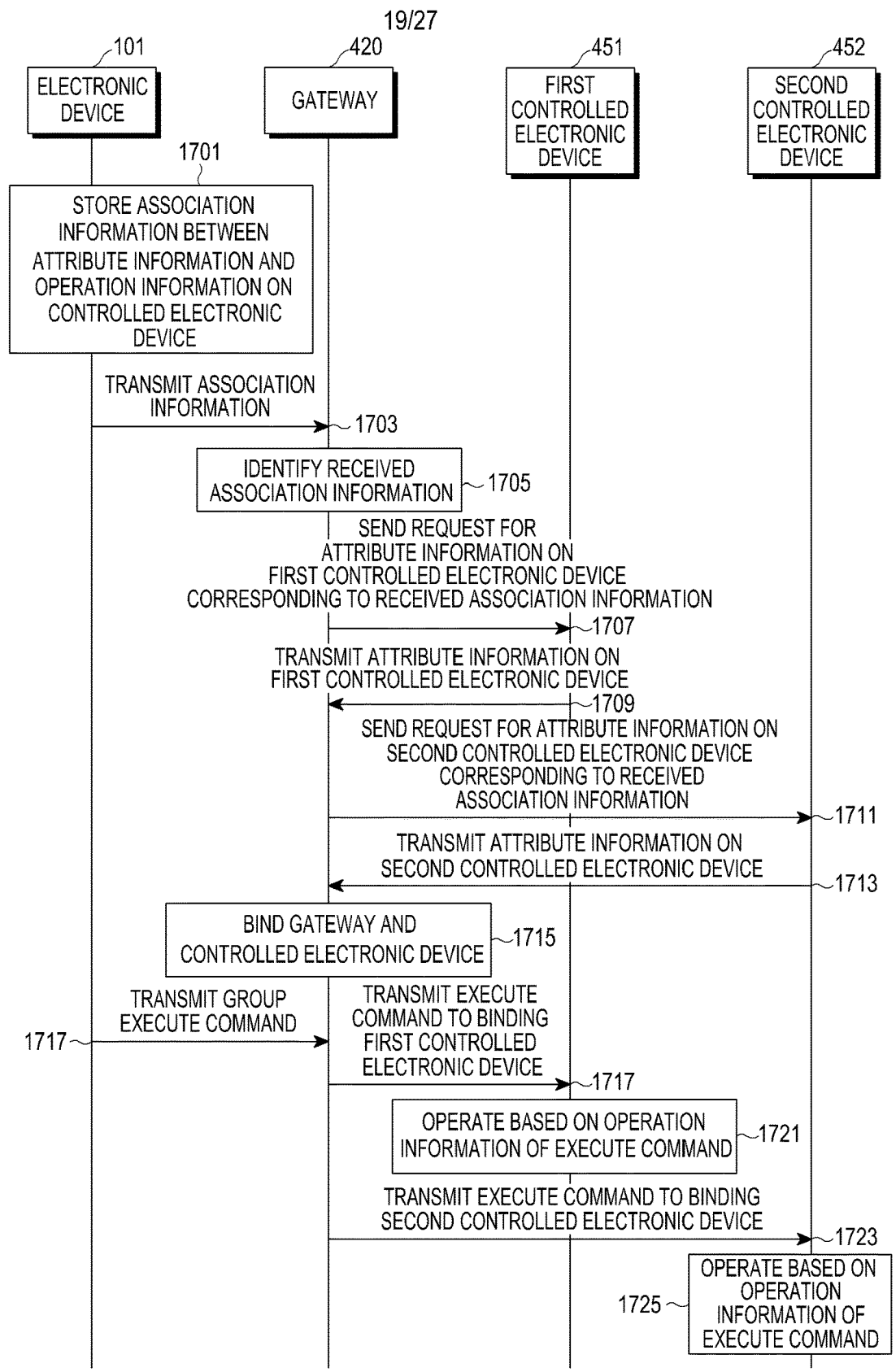
FIG. 17 is a flowchart illustrating a method for controlling an electronic device according to an exemplary embodiment.

FIG. 17 is a flowchart illustrating a method for controlling an electronic device according to an exemplary embodiment.

In operation 1701, the electronic device 101 may store association information including attribute information and operation information on a controlled electronic device. As described above, the electronic device 101 may generate and store the association information based on a user input or may receive the association information from another electronic device. For example, the electronic device 101 may store association information including the attribute information on the 'lighting device' and the operation information of 'turn on' and the attribute information on the 'room heating/cooling device' and the operation information of 'adjust temperature to 24° C.'

In operation 1703, the electronic device 101 may transmit the association information to the gateway 420. The electronic device 101 may transmit the association information when entering the network managed by the gateway 420 or may transmit the association information to the gateway 420 in the process of enrolling in the network.

In operation 1705, the gateway 420 may identify the received association information. For example, the gateway 420 may identify the attribute information on the 'lighting device' and 'room heating/cooling device' and the operation information of 'turn on' and 'adjust temperature to 24° C.' in the received association information.

In operations 1707 and 1711, the gateway 420 may send a request for attribute information on a controlled electronic device to the controlled electronic device in the network corresponding to the received association information. In operations 1709 and 1713, the controlled electronic devices 451 and 452 may transmit the attribute information on the controlled electronic devices.

In operation 1715, the gateway 420 may bind the gateway 420 with the controlled electronic devices 451 and 452. The gateway 420 may compare the attribute information on the controlled electronic device received from the first controlled electronic device 451 with the attribute information of the association information received from the electronic device 101 and may perform the binding according to a result of the comparison. The gateway 420 may bind with the first controlled electronic device 451 and/or the second controlled electronic device 452 having the attribute information corresponding to the attribute information of the association information received from the electronic device 101. According to an exemplary embodiment, the gateway 420 may perform the binding in a manner of updating the association information received from the electronic device 101 with access information (e.g., URL or MAC address) on the first controlled electronic device 451 and/or the second controlled electronic device 452.

In operation 1717, the electronic device 101 may transmit an execute command to the gateway 420. For example, the electronic device 101 may transmit the execute command to the gateway 420 corresponding to a command input from the user.

In operations 1719 and 1723, the gateway 420 may transmit the execute command to the binding controlled electronic devices 451 and 452. In operations 1721 and 1725, the controlled electronic devices 451 and 452 may operate based on the operation information of the execute command. According to an exemplary embodiment, the gateway 420 may transmit only the operation information to the first and/or second controlled electronic device 451, 452 that is bound with the gateway 420. In this case, the first and/or second controlled electronic device 451, 452 may operate based on the received operation information.

Figure 18:
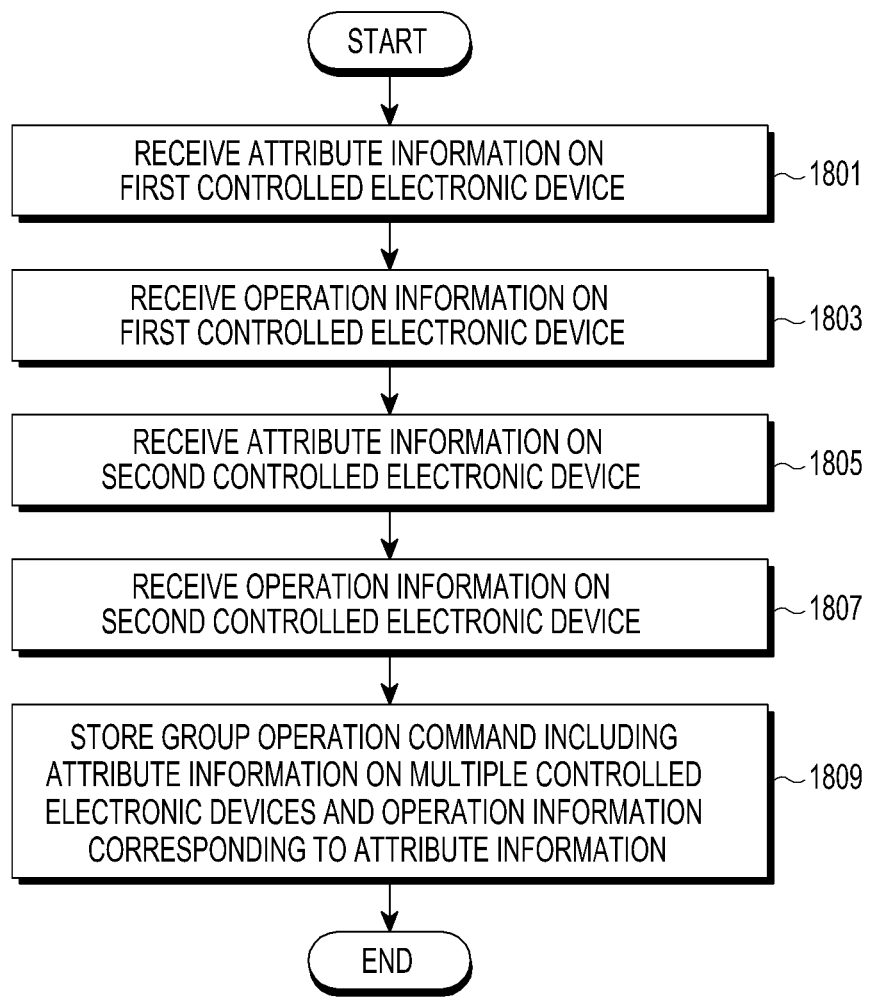
FIG. 18 is a flowchart illustrating a method for generating a group operation command according to an exemplary embodiment.
Figure 19A:
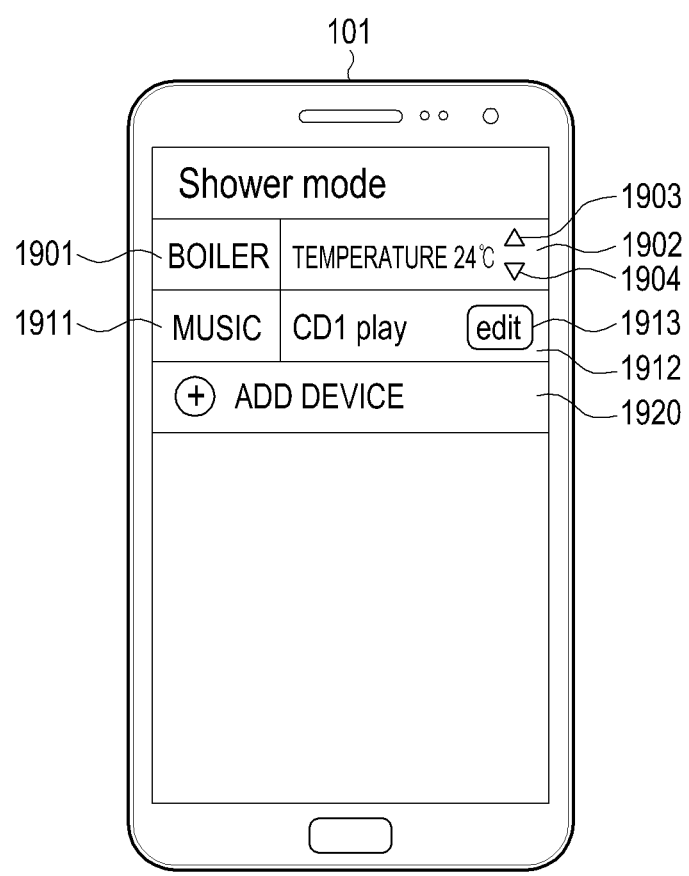
FIGS. 19A and 19B are concept views illustrating screens of an electronic device according to embodiments.
Figure 19B:
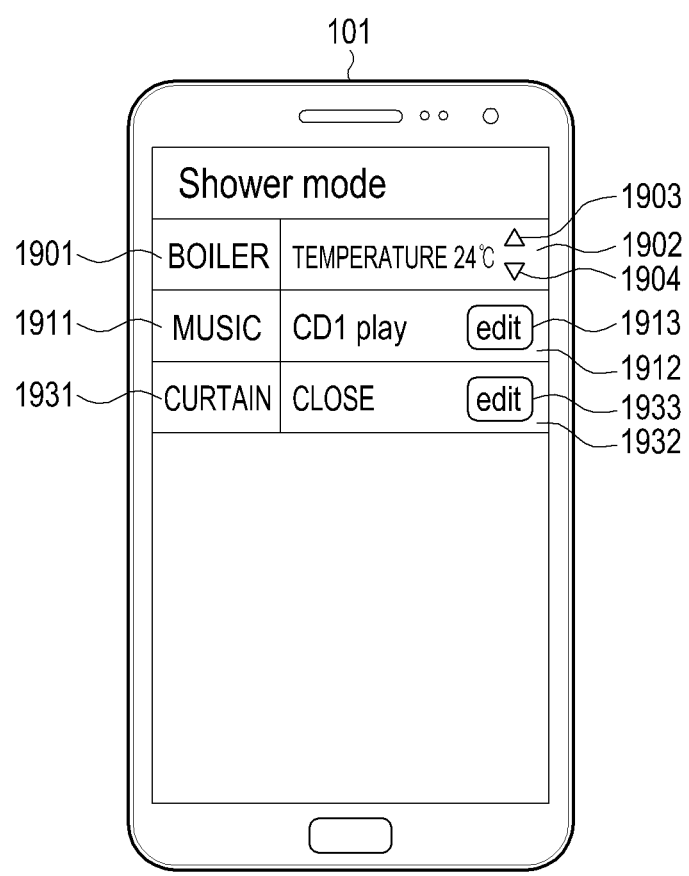

FIG. 18 is a flowchart illustrating a method for generating a group operation command according to an exemplary embodiment. FIGS. 19A and 19B are concept views illustrating screens of an electronic device according to embodiments.

In operation 1801, the electronic device 101 may receive attribute information on a first controlled electronic device. In operation 1803, the electronic device 101 may receive the operation information on the first controlled electronic device. In operation 1805, the electronic device 101 may receive the attribute information on a second controlled electronic device. In operation 1807, the electronic device 101 may receive the operation information on the second controlled electronic device.

For example, as shown in FIG. 19A, the electronic device 101 may display a graphic user interface to generate a group operation command of a shower mode. For example, the electronic device 101 may display attribute information 1901 and 1911 and operation information 1902 and 1912 of the group operation command. The electronic device 101 may further display function keys 1903, 1904, and 1913 to edit the operation information 1902 and 1912, respectively. For example, as shown in FIG. 19A, the electronic device 101 may display a function key 1903 to increase the temperature of the boiler 1901 and a function key 1904 to decrease the temperature of the boiler 1901. In response to selection of the function keys 1903 and 1904, the electronic device 101 may adjust the temperature that is the operation information corresponding to the 'boiler' attribute information in the group operation command. Further, in response to selection of the function key 1913, the electronic device 101 may change compact discs (CDs) to be played that are the operation information corresponding to the 'music' attribute information in the group operation command. The electronic device 101 may further display a function key 1920 to add attribute information and operation information of the group operation command.

FIG. 19B shows an example of a screen that is displayed in response to selection of the function key 1920 (see FIG. 19A) that enables addition of the attribute information and operation information of the group operation command. The electronic device 101 may add, to the group operation command, 'curtain' attribute information 1931 and 'close' operation information 1932 corresponding to the 'curtain' attribute information 1931. Further, the electronic device 101 may further display a function key 1933 that enables edition of the operation information 1932. The electronic device 101 may display a graphic user interface that enables selection of attribute information and may determine attribute information according to an input to the graphic user interface.

It should be noted that displaying the graphic user interface and generating a group operation command corresponding to an input through the graphic user interface are merely an example, and according to an exemplary embodiment, the electronic device 101 may receive a group operation command from another electronic device. For example, a group operation command may be stored in a cloud server and may be provided in response to a request from the electronic device 101. Or, the electronic device 101 may copy a group operation command to the other electronic device or may copy a group operation command from the other electronic device.

In operation 1809, the electronic device 101 may store a group operation command including attribute information and operation information corresponding to the attribute information on at least one controlled electronic device.

Figure 20:
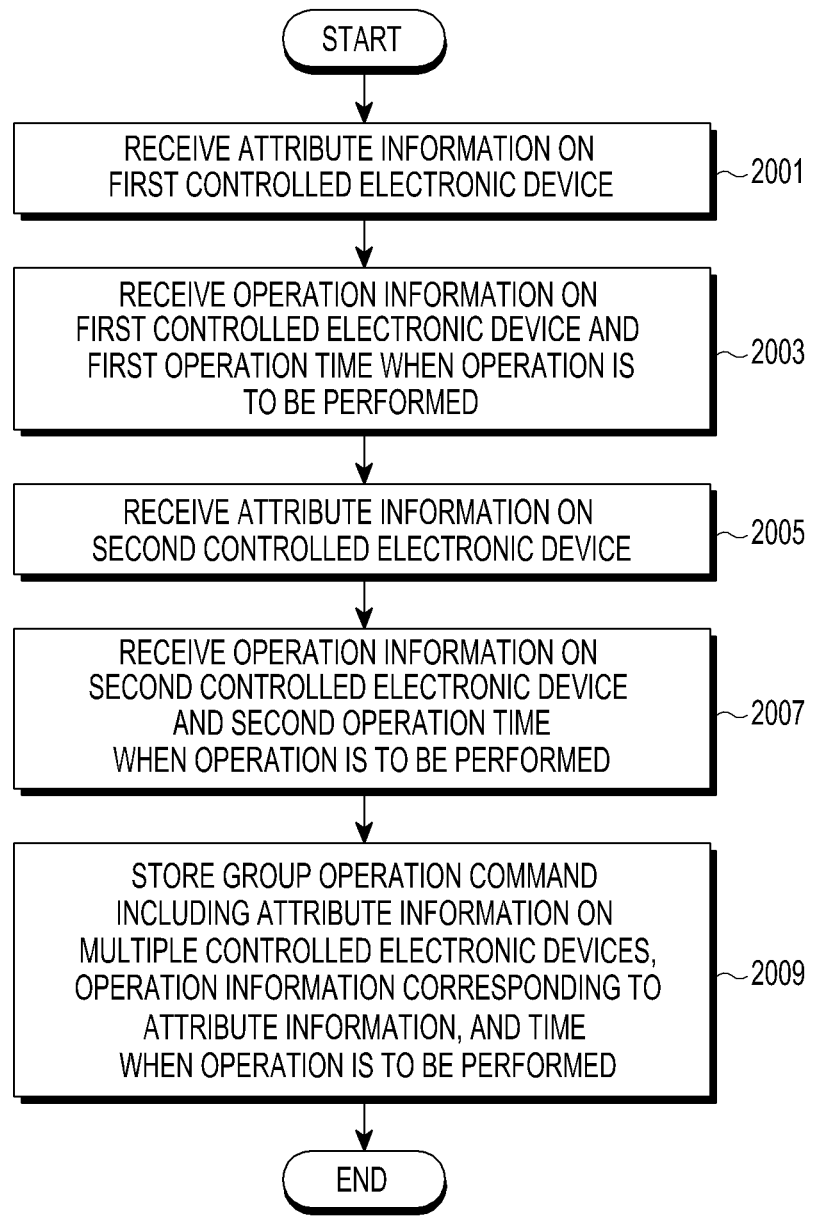
FIG. 20 is a flowchart illustrating an operation of an electronic device according to an exemplary embodiment.

FIG. 20 is a flowchart illustrating an operation of an electronic device according to an exemplary embodiment.

In operation 2001, the electronic device 101 may receive attribute information on a first controlled electronic device. In operation 2003, the electronic device 101 may receive operation information on the first controlled electronic device and a first operation time when an operation is to be performed. In operation 2005, the electronic device 101 may receive the attribute information on the second controlled electronic device. In operation 2007, the electronic device 101 may receive operation information on the second controlled electronic device and a second operation time when the operation is to be performed. In operation 2009, the electronic device 101 may store the group operation command including the attribute information on the at least one controlled electronic device, the operation information corresponding to the attribute information, and the time when the operation is performed.

For example, the electronic device may generate and store a group operation command as shown in Table 6.

TABLE 6

| Attribute information | Operation information | Time of operation |
|---|---|---|
| Lighting device | Turn on | t1 |
| Room heating/cooling device | Adjust temperature to 24° C. | t2 |
| Room heating/cooling device | Adjust to 18° C. | t3 |
| Lighting device | Turn off | t4 |

As shown in Table 6, the electronic device 101 may generate a group operation command that enables the 'lighting device' to turn on at the operation time t1, the 'room heating/cooling device' to 'adjust temperature to 24° C.' at the operation time t2, the 'room heating/cooling device' to 'adjust to 18° C.' at the operation time t3, and the 'lighting device' to 'turn off' at the operation time t4. In particular, the electronic device 101 may generate and store a group operation command that each corresponds to one of operation times t1 to t4 and perform based on different operation information for one attribute information, 'lighting device.'

Figure 21:
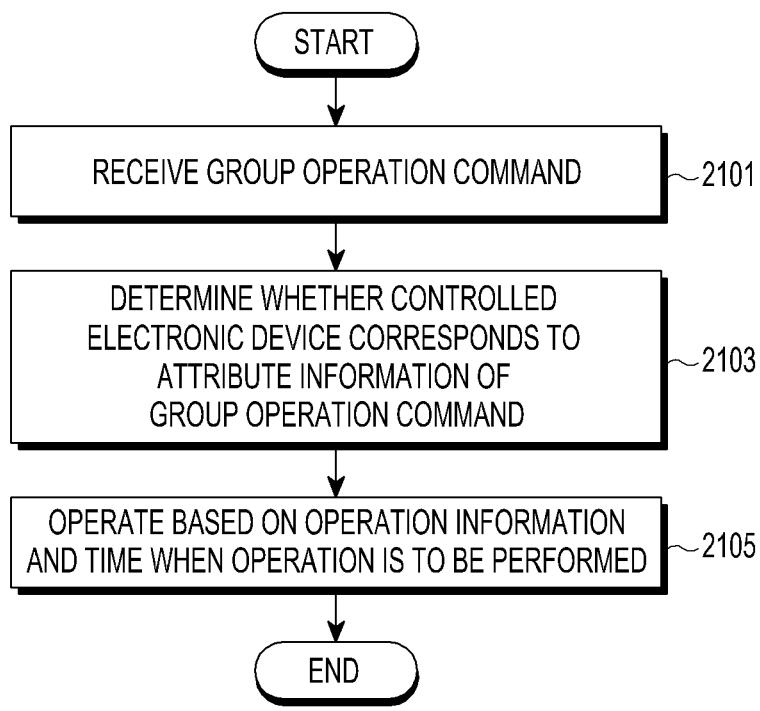
FIG. 21 is a flowchart illustrating a method for controlling a controlled electronic device according to an exemplary embodiment.

FIG. 21 is a flowchart illustrating a method for controlling a controlled electronic device according to an exemplary embodiment.

In operation 2101, the controlled electronic device 451 may receive a group operation command. According to an exemplary embodiment, the group operation command may include attribute information, operation information, and a time of operation. For example, the controlled electronic device 451 may receive a group operation command as shown in Table 6. Further, the controlled electronic device 451 is assumed to have the attribute information of 'lighting device.'

In operation 2103, the controlled electronic device 451 may determine whether the controlled electronic device 451 corresponds to the attribute information of the group operation command. For example, upon identifying that attribute information of the controlled electronic device 451, i.e., 'lighting device', is included in the group operation command, the controlled electronic device 451 may determine that the controlled electronic device 451 corresponds to the attribute information of the group operation command.

In operation 2105, the controlled electronic device 451 may operate based on the operation information and the operation time when the operation is to be performed. For example, according to the group operation command corresponding to the attribute information 'lighting device' as shown in Table 6, the controlled electronic device 451 may operate based on the operation information such that the controlled electronic device 451 turns on at the operation time t1 and turns off at the operation time t4.

Figure 22A:
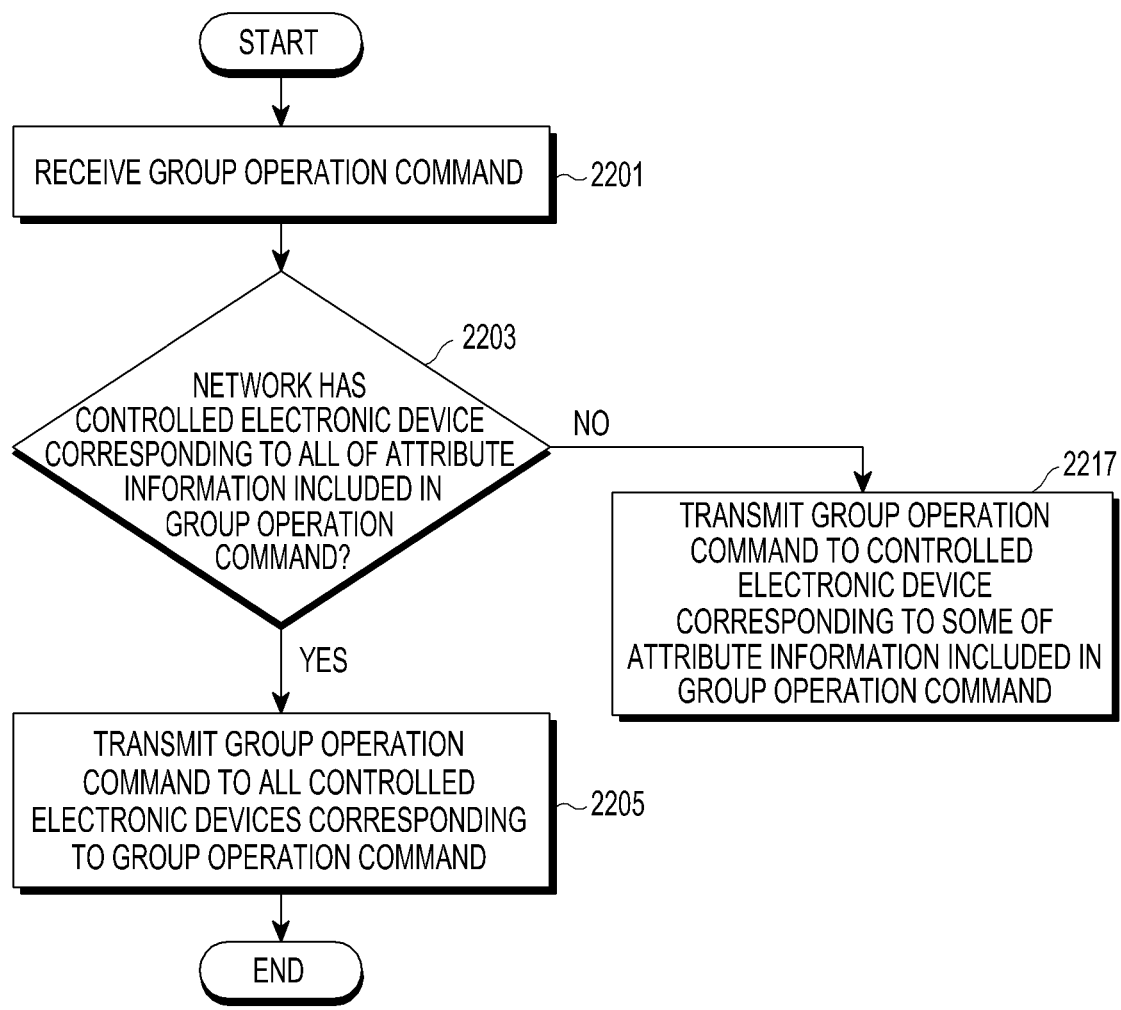
FIGS. 22A, 22B, and 22C are flowcharts illustrating operations of a gateway according to embodiments.
Figure 22B:
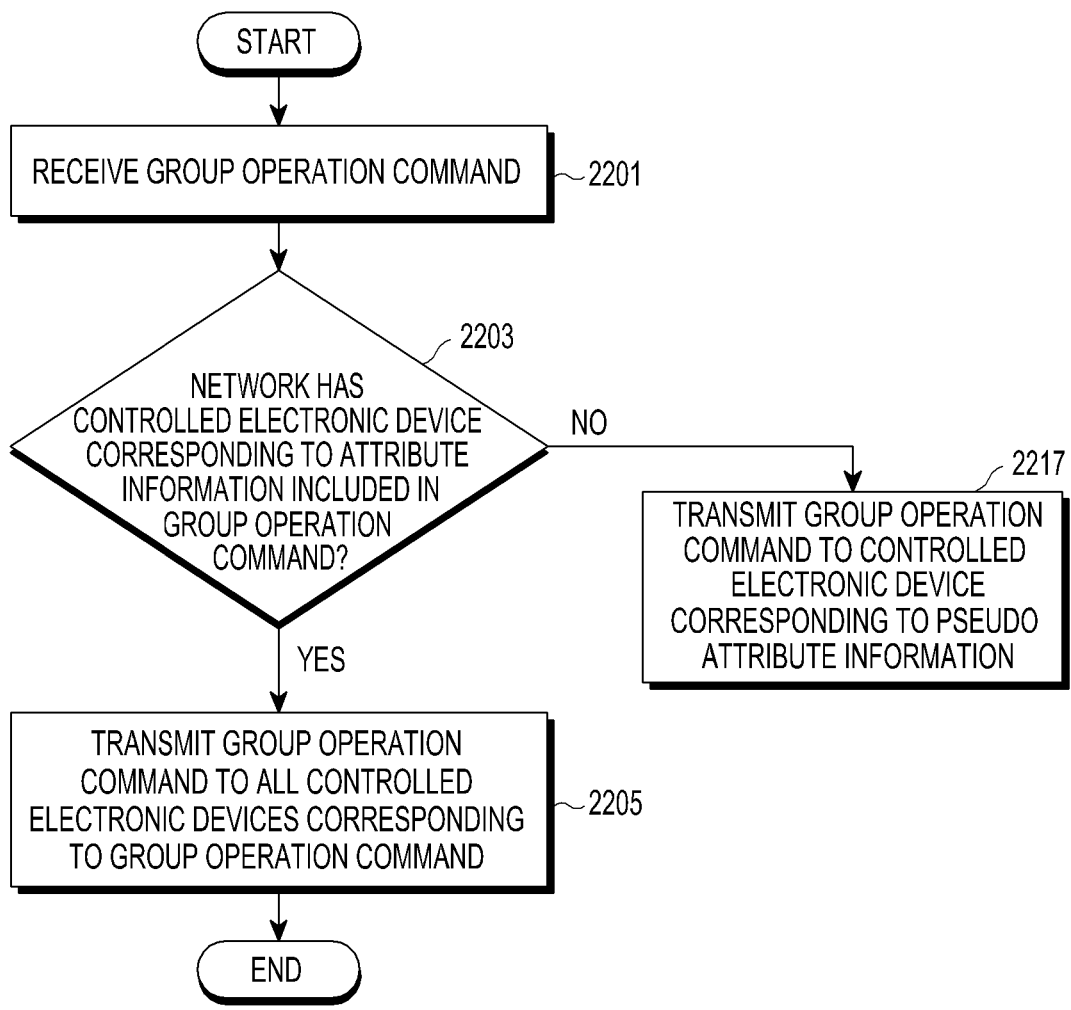
Figure 22C:
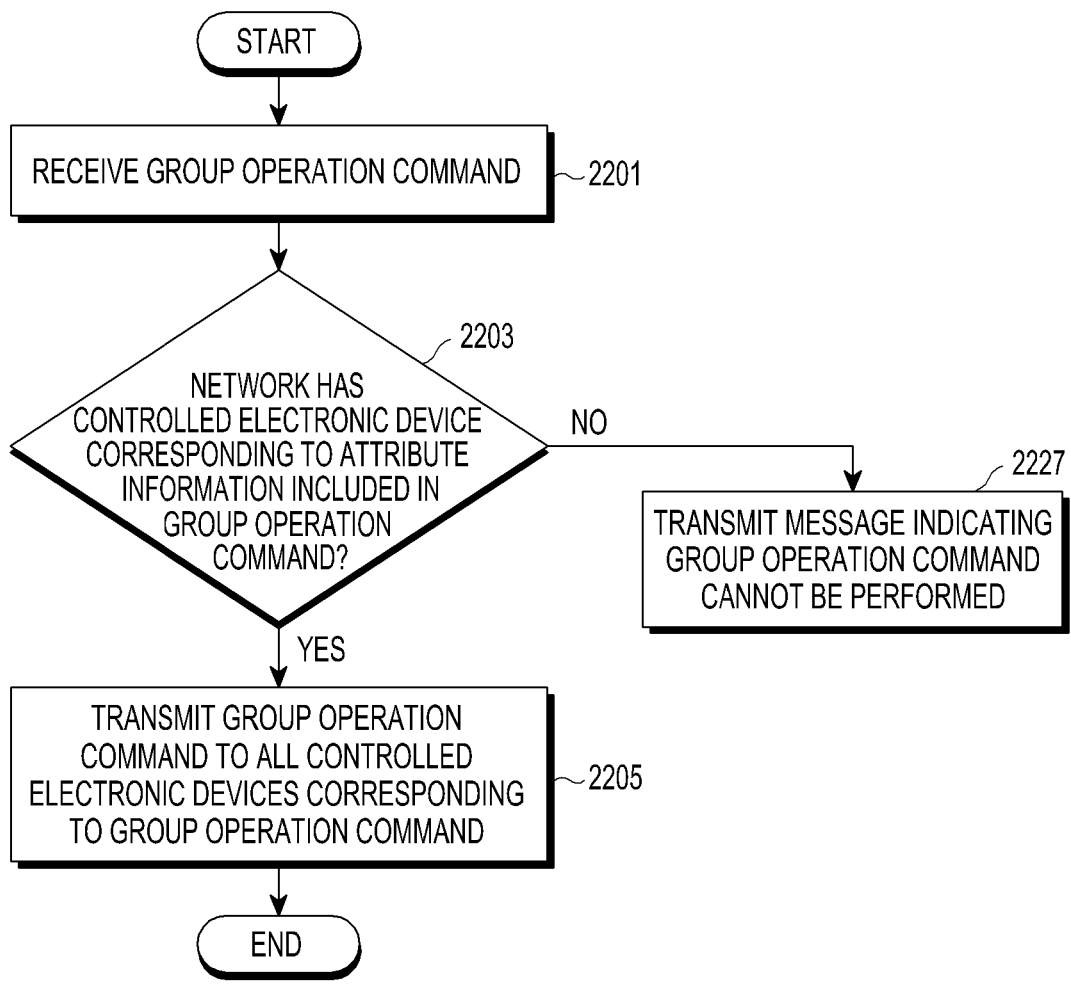

FIGS. 22A, 22B, and 22C are flowcharts illustrating operations of a gateway according to embodiments.

Referring to FIG. 22A, the gateway 420 may receive a group operation command in operation 2201. In operation 2203, the gateway 420 may determine whether the network has a controlled electronic device corresponding to all of the attribute information included in the group operation command.

In operation 2205, when the network has one or more of the controlled electronic device corresponding to all of the attribute information in the group operation command, the gateway 420 may transmit group operation commands to the one or more of the controlled electronic devices corresponding to all of the attribute information in the group operation command.

On the other hand, the network may have controlled electronic devices corresponding to only some of the attribute information in the group operation command. In operation 2207, the gateway 420 may transmit group operation commands to controlled electronic devices corresponding to some of the attribute information of the group operation command.

FIG. 22B is a flowchart illustrating a method for controlling a gateway according to an exemplary embodiment. According to the exemplary embodiment of FIG. 22B, when the network has controlled electronic devices corresponding to only some of the attribute information in the group operation command, the gateway 420 may transmit group operation commands to the controlled electronic devices corresponding to pseudo attribute information in operation 2217. For example, when the group operation command includes the 'sound device' attribute information, the gateway 420 may determine that the network does not include controlled electronic devices having the 'sound device' attribute information. In this case, the gateway 420 may transmit group operation commands to controlled electronic devices having the attribute information (or pseudo attribute information) of 'TV.'

FIG. 22C is a flowchart illustrating a method for controlling a gateway according to an exemplary embodiment. According to the exemplary embodiment of FIG. 22C, when the network may have controlled electronic devices corresponding to only some of the attribute information in the group operation command, the gateway 420 may transmit a message indicating that the group operation command cannot be performed to the electronic device 101 in operation 2227.

According to an exemplary embodiment, a method for controlling an electronic device may include storing a group operation command including attribute information and operation information on each of at least one controlled electronic device and when the electronic device enters a first network, transmitting the group operation command to a gateway managing the first network or each of at least one first controlled electronic device corresponding to the group operation command in the first network.

According to an exemplary embodiment, the method for controlling the electronic device may further include receiving at least one of the attribute information and the operation information on each of the at least one controlled electronic device and generating the group operation command based on the received at least one of the attribute information and the operation information on each of the at least one controlled electronic device.

According to an exemplary embodiment, the method for controlling the electronic device may further include performing an authentication procedure to control the at least one controlled electronic device. The attribute information may be classified as per operation functions of the at least one controlled electronic device. The group operation command may further include information on an operation time of each of the at least one controlled electronic device.

According to an exemplary embodiment, the method for controlling the electronic device may further include determining the at least one controlled electronic device based on the attribute information included in the group operation command.

According to an exemplary embodiment, a method for controlling a gateway managing a first network may include receiving a group operation command including attribute information and operation information on each of at least one controlled electronic device from an electronic device entering the first network and transmitting a group operation command including the operation information to each of at least one first controlled electronic device corresponding to the group operation command.

According to an exemplary embodiment, the method for controlling the gateway may further include receiving attribute information on each of at least one electronic device in the first network.

According to an exemplary embodiment, the method for controlling the gateway may further include comparing attribute information on each of at least one electronic device in the first network with attribute information included in the group operation command and determining the at least one first controlled electronic device based on a result of the comparison.

According to an exemplary embodiment, receiving the attribute information on each of the at least one electronic device in the first network may include receiving attribute information on each of at least one electronic device in the first network in a process of enrolling at least one electronic device in the first network in the first network.

According to an exemplary embodiment, receiving the attribute information on each of the at least one electronic device in the first network may further include sending a request for attribute information to each of at least one electronic device in the first network corresponding to reception of the group operation command.

According to an exemplary embodiment, the method for controlling the gateway may further include performing an authentication procedure to control the at least one controlled electronic device. The attribute information may be classified as per operation functions of the at least one controlled electronic device. The group operation command may further include information on an operation time of each of the at least one controlled electronic device.

Each of the aforementioned components of the electronic device may include one or more parts, and a name of the part may vary with a type of the electronic device. The electronic device in accordance with various exemplary embodiments may include at least one of the aforementioned components, omit some of them, or include other additional component(s). Some of the components may be combined into an entity, but the entity may perform the same functions as the components may do.

The term 'module' may refer to a unit including one of hardware, software, and firmware, or a combination thereof. The term 'module' may be interchangeably used with a unit, logic, logical block, component, or circuit. The module may be a minimum unit or part of an integrated component. The module may be a minimum unit or part of performing one or more functions. The module may be implemented mechanically or electronically. For example, the module may include at least one of application specific integrated circuit (ASIC) chips, field programmable gate arrays (FPGAs), or programmable logic arrays (PLAs) that perform some operations, which have already been known or will be developed in the future.

According to an exemplary embodiment, at least a part of the device (e.g., modules or their functions) or method (e.g., operations) may be implemented as instructions stored in a computer-readable storage medium e.g., in the form of a program module. The instructions, when executed by a processor (e.g., the processor 120), may enable the processor to carry out a corresponding function. The computer-readable storage medium may be e.g., the memory 130.

The computer-readable storage medium may include a hardware device, such as hard discs, floppy discs, and magnetic tapes (e.g., a magnetic tape), optical media such as compact disc read only memories (ROMs) (CD-ROMs) and digital versatile discs (DVDs), magneto-optical media such as floptical disks, ROMs, random access memories (RAMs), flash memories, and/or the like. Examples of the program instructions may include not only machine language codes but also high-level language codes which are executable by various computing means by using an interpreter. The aforementioned hardware devices may be configured to operate as one or more software modules to carry out exemplary embodiments, and vice versa.

Modules or programming modules in accordance with various exemplary embodiments may include at least one or more of the aforementioned components, omit some of them, or further include other additional components. Operations performed by modules, programming modules or other components in accordance with various embodiments may be carried out sequentially, simultaneously, repeatedly, or heuristically. Furthermore, some of the operations may be performed in a different order, or omitted, or include other additional operation(s).

According to an exemplary embodiment, there is provided a storage medium storing commands, the commands configured to be executed by at least one processor to enable the at least one processor to perform at least one operation, wherein the at least one operation may comprise storing a group operation command including attribute information and operation information on each of at least one controlled electronic device and when the electronic device enters a first network, transmitting the group operation command to a gateway managing the first network or each of at least one first controlled electronic device corresponding to the group operation command in the first network.

As is apparent from the foregoing description, according to an exemplary embodiment, there may be provided an electronic device and gateway that may perform a group operation command independently from a network and a method for controlling the gateway and electronic device. Accordingly, the user can use a group operation command performed in a first network in a second network. In particular, even when the first network is not connected with the second network, the electronic device may perform control so that a group operation command may be performed, according to an exemplary embodiment. Further, even when controlled electronic devices in a network are produced by different manufacturers, the electronic device may perform control so that a group operation command may be performed, according to an exemplary embodiment.

Although a few embodiments have been shown and described, it would be appreciated by those skilled in the art that changes may be made in the exemplary embodiments without departing from the principles and spirit of the disclosure, the scope of which is defined in the claims and their equivalents.

What is claimed is:

1. A method for controlling a controlled electronic device by using an electronic device, the method comprising:
    receiving, by the electronic device and from at least one first controlled electronic device being included in a first network, first attribute information of the at least one first controlled electronic device, the first attribute information representing a category that is classified according to a function of the at least one first controlled electronic device;
    displaying, via a user interface, the first attribute information received from the at least one first controlled electronic device and operation information corresponding to the at least one first controlled electronic device;
    receiving, via the user interface, a user input to generate a group operation command with respect to the first network, the group operation command comprising the first attribute information and the operation information corresponding to the at least one first controlled electronic device in association with each other;
    generating and storing in advance, in the electronic device, the group operation command with respect to the first network based on the user input;
    entering a second network different from the first network, and obtaining second attribute information of two or more second controlled electronic devices that are included in the second network from the two or more second controlled electronic devices;
    comparing the second attribute information of the two or more second controlled electronic devices with the first attribute information included in the group operation command, and selecting at least one second controlled electronic device having the same attribute information as the first attribute information included in the group operation command based on a result of comparison, among the two or more second controlled electronic devices, the at least one second controlled electronic device being different from the at least one first controlled electronic device; and
    transmitting the group operation command that is generated and stored in advance in the electronic device with respect to the first network to at least one of a gateway, included in the second network and configured to manage the second network, or the at least one second controlled electronic device that is selected based on the result of comparison, the group operation command controlling the at least one second controlled electronic device to perform an operation based on the operation information included in the group operation command.

2. The method of claim 1, further comprising:
    receiving at least one of the first attribute information and the operation information corresponding to the at least one first controlled electronic device included in the group operation command; and
    generating the group operation command based on the received at least one of the first attribute information and the operation information.

3. The method of claim 1, further comprising performing an authentication procedure on the electronic device to control the at least one second controlled electronic device according to a result of the authentication procedure.

4. The method of claim 1, wherein the group operation command further comprises information on a time of performing the operation based on the operation information corresponding to the at least one first controlled electronic device.

5. The method of claim 1, wherein the electronic device is configured to request for the group operation command to a cloud server and receive the group operation command from the cloud server.

6. An electronic apparatus, comprising:
    a communication circuit configured to receive, from at least one first controlled electronic device being included in a first network, first attribute information of the at least one first controlled electronic device, the first attribute information representing a category that is classified according to a function of the at least one first controlled electronic device;
    a user interface configured to display the first attribute information received from the at least one first controlled electronic device and operation information corresponding to the at least one first controlled electronic device, and configured to receive a user input to generate a group operation command with respect to the first network, the group operation command comprising the first attribute information and the operation information corresponding to the at least one first controlled electronic device in association with each other;

a memory configured to store the group operation command that is generated with respect to the first network based on the user input; and a processor configured to read program code stored in the memory and operate as instructed by the program code, wherein the program code is configured to cause the processor to:

enter a second network different from the first network, and obtain second attribute information of two or more second controlled electronic devices that are included in the second network from the two or more second controlled electronic devices;

compare the second attribute information of the two or more second controlled electronic devices with the first attribute information included in the group operation command, and select at least one second controlled electronic device having the same attribute information as the first attribute information included in the group operation command based on a result of comparison, among the two or more second controlled electronic devices, the at least one second controlled electronic device being different from the at least one first controlled electronic device: and transmit the group operation command that is generated and stored in advance in the electronic apparatus with respect to the first network to at least one of a gateway, included in the second network and configured to manage the second network, or the at least one second controlled electronic device that is selected based on the result of comparison, the group operation command controlling the at least one second controlled electronic device to perform an operation based on the operation information included in the group operation command.

7. The electronic apparatus of claim 6, further comprising an input/output interface configured to receive at least one of the first attribute information and the operation information corresponding to the at least one first controlled electronic device, wherein the program code is further configured to cause the processor to generate the group operation command based on the received at least one of the first attribute information and the operation information.

8. The electronic apparatus of claim 6, wherein the program code is further configured to cause the processor to perform an authentication procedure on the electronic apparatus to control the at least one second controlled electronic device according to a result of the electronic apparatus.

9. The electronic apparatus of claim 6, wherein the group operation command further comprises information on a time of performing the operation based on the operation information corresponding to the at least one first controlled electronic device.

10. A method for controlling a gateway that manages a network, the method comprising:

receiving, from an electronic device that enters a second network, a group operation command generated and stored in advance in the electronic device, with respect to a first network different from the second network, the group operation command comprising first attribute information of at least one first controlled electronic device and operation information corresponding to the at least one first controlled electronic device in association with each other, the at least one first controlled electronic device being included in the first network, the first attribute information representing a category that is classified according to a function of the at least one first controlled electronic device; and transmitting at least the operation information, included in the group operation command with respect to the first network, to at least one second controlled electronic device that is included in the second network, the at least one second controlled electronic device being different from the at least one first controlled electronic device and having the same attribute information as the first attribute information of the at least one first controlled electronic device, the at least the operation information controlling the at least one second controlled electronic device to perform an operation based on the at least the operation information, wherein the method further comprises:

receiving second attribute information of the at least one second controlled electronic device from the at least one second controlled electronic device;

comparing the second attribute information of the at least one second controlled electronic device with the first attribute information that is included in the group operation command; and determining that the at least one second controlled electronic device has the same attribute information as the first attribute information included in the group operation command based on a result of the comparing.

11. The method of claim 10, wherein the receiving the second attribute information comprises receiving the second attribute information of the at least one second controlled electronic device in a process of enrolling the at least one second controlled electronic device in the second network.

12. The method of claim 10, wherein the receiving the second attribute information comprises sending a request for the second attribute information to the at least one second controlled electronic device in the second network in response to receiving the group operation command.

13. The method of claim 10, further comprising performing an authentication procedure on the electronic device to control the at least one second controlled electronic device according to a result of the authentication procedure.

14. The method of claim 10, wherein the group operation command further comprises information on a time of performing the operation based on the operation information corresponding to the at least one first controlled electronic device.

* * * * *